United States Patent
Machida et al.

(10) Patent No.: US 11,538,249 B2
(45) Date of Patent: Dec. 27, 2022

(54) INDOOR CAMERA AND ACTION LOG RECORDING SYSTEM

(71) Applicant: PANASONIC INTELLECTUAL PROPERTY MANAGEMENT CO., LTD., Osaka (JP)

(72) Inventors: Takanobu Machida, Fukuoka (JP); Hiroyoshi Hatae, Fukuoka (JP); Takashi Uchida, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 226 days.

(21) Appl. No.: 17/146,998

(22) Filed: Jan. 12, 2021

(65) Prior Publication Data

US 2021/0216786 A1 Jul. 15, 2021

(30) Foreign Application Priority Data

Jan. 14, 2020 (JP) .............................. JP2020-003751

(51) Int. Cl.
*G06T 9/00* (2006.01)
*G06V 20/52* (2022.01)
(Continued)

(52) U.S. Cl.
CPC ............ *G06V 20/52* (2022.01); *G01J 5/0025* (2013.01); *G06T 7/73* (2017.01); *G06V 40/10* (2022.01);
(Continued)

(58) Field of Classification Search
CPC ........ G06V 20/52; G06V 40/10; G06V 10/25; G01J 5/0025; G01J 2005/0077; G06T 7/73; H04N 5/23299; H04N 5/23216; H04N 5/23218; H04N 5/232933; H04N 5/232935; H04N 5/232945; H04N 5/2351; H04N 5/232; G01S 5/16
(Continued)

(56) References Cited

U.S. PATENT DOCUMENTS

| | | |
|---|---|---|
| 2013/0243389 A1 | 9/2013 | Seto et al. |
| 2015/0288873 A1 | 10/2015 | Seto et al. |
| 2016/0302393 A1* | 10/2016 | Pradeep ............... A01K 29/005 |

FOREIGN PATENT DOCUMENTS

| | | |
|---|---|---|
| JP | 2013-219753 | 10/2013 |
| JP | 2016-214173 | 12/2016 |

* cited by examiner

*Primary Examiner* — Stephen P Coleman
(74) *Attorney, Agent, or Firm* — Greenblum & Bernstein, P.L.C.

(57) ABSTRACT

An indoor camera includes: an image capturing unit; a storage unit configured to store at least one detection area in association with stagnation times, the detection area that is a target area for detecting stagnation of a pet, and the stagnation times indicating the number of times when the pet enters the detection area and stagnates in the detection area; and a processor configured to detect a position of the pet and count the stagnation times of the pet in the detection area based on captured images. If determining, based on the captured images, that the pet stagnates in the detection area for a predetermined time period or longer, the processor increments and counts the stagnation times of the pet in the detection area and generates an action log including identification information of the detection area and information on the stagnation times.

7 Claims, 13 Drawing Sheets

(51) Int. Cl.
  *G06T 7/73* (2017.01)
  *H04N 5/232* (2006.01)
  *G01J 5/00* (2022.01)
  *G06V 40/10* (2022.01)

(52) U.S. Cl.
  CPC .. *H04N 5/23299* (2018.08); *G01J 2005/0077* (2013.01)

(58) Field of Classification Search
  USPC .......................................................... 382/103
  See application file for complete search history.

| RECORDING START TIME | 01 Jan 2019 10:15:28 |
|---|---|
| DETECTION AREA | Sleep |
| TIMING OF STAGNATION FLAG ON | 00:25:16 |
| TIMING OF STAGNATION FLAG OFF | 00:46:32 |
| STAGNATION COUNT-UP COMPLETION TIMING | 00:40:16 |
| RECORDING LENGTH | 00:56:32 |

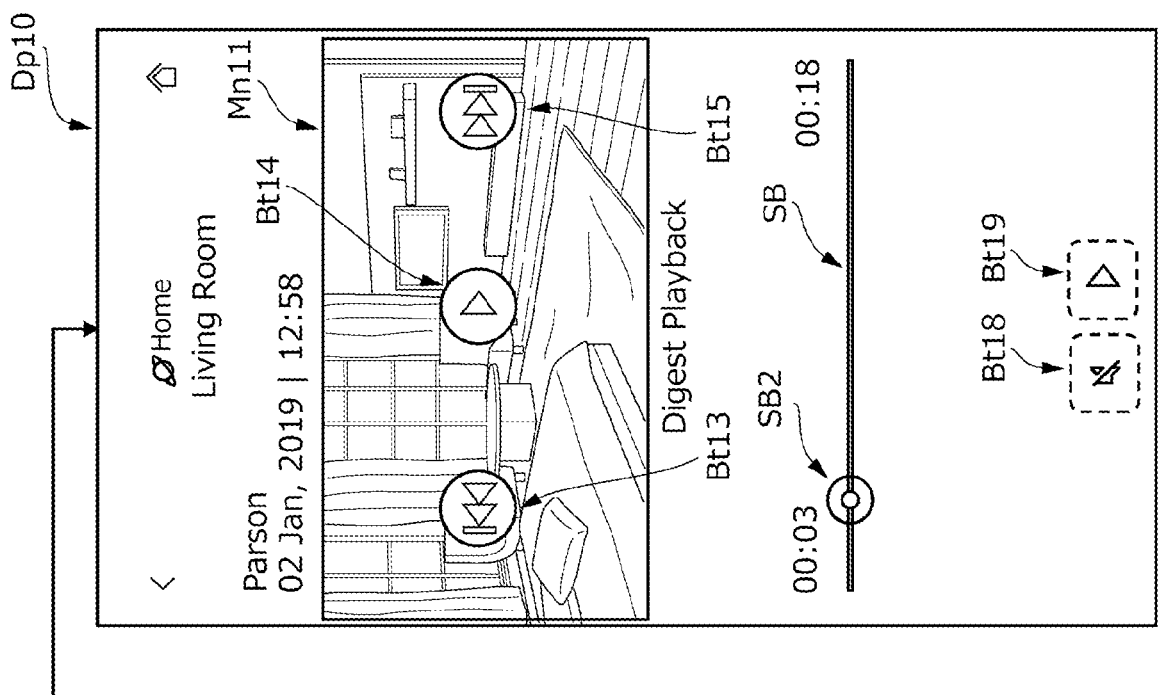
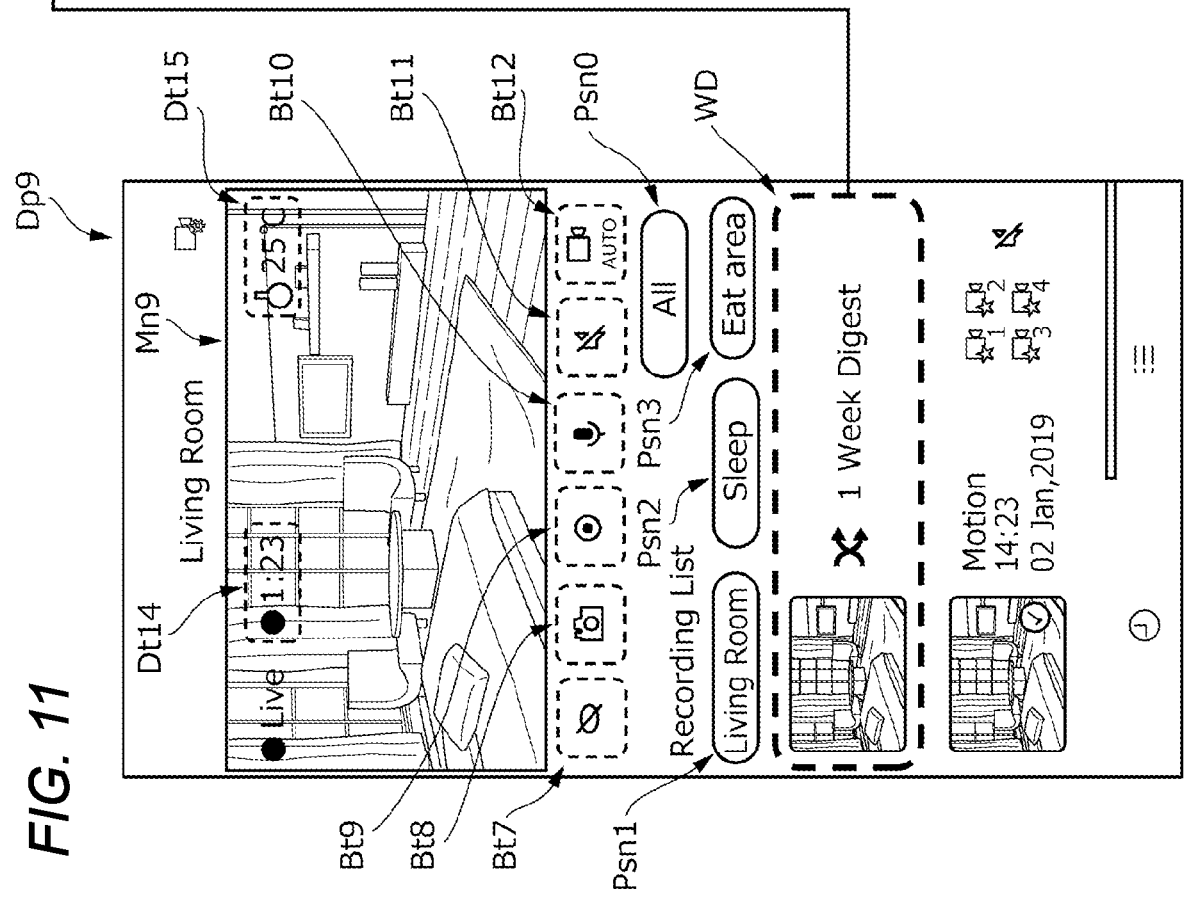
FIG. 11

INDOOR CAMERA AND ACTION LOG RECORDING SYSTEM

CROSS-REFERENCE TO RELATED APPLICATIONS

This application is based on and claims priority to Japanese Patent Application No. 2020-003751 filed on Jan. 14, 2020, the entire contents of which are incorporated herein by reference.

FIELD

The present disclosure relates to an indoor camera and an action log recording system.

BACKGROUND

JP-A-2016-214173 discloses a pet watching system including a beacon apparatus attached to a pet product used by a pet, a camera control apparatus connected to a camera installed such that an image of the pet product can be captured, and a carried communication terminal that obtains and displays a captured image. When detecting that the pet uses the pet product in which the beacon apparatus is installed, the pet watching system generates a beacon signal that can identify the pet product and transmits the generated beacon signal to the camera control apparatus. Based on identification information included in the beacon signal, the pet watching system causes the camera to capture images of the pet product and the pet that uses the pet product, uploads captured images to an image posting server, and causes the carried communication terminal to obtain and display the uploaded captured images.

JP-A-2013-219753 discloses an image processing apparatus including an image processing unit that generates moving image data based on image capturing data obtained by an image capturing instruction from a user and a controller that records the moving image data in a recording medium. When a moving image file is already recorded in the recording medium and the moving image data is associated with the existing moving image file, or when the user selects to add the moving image data, the image processing apparatus adds the moving image data to the existing moving image file.

SUMMARY

However, in the configuration of JP-A-2016-214173, when capturing images of the pet product and the pet that uses the pet product, the user has to purchase beacon apparatuses in accordance with the number of places where an image of the pet is desired to be captured, and a monetary load of the user required for purchasing the beacon apparatuses is large. Further, the user has to attach the purchased beacon apparatuses to pet products, which is troublesome.

The present disclosure has been devised in view of the conventional circumstances described above and an object thereof is to provide an indoor camera and an action log recording system that detects and records an action of a pet in a plurality of detection areas set by a user operation.

The present disclosure provides an indoor camera configured to capture an image of a pet, the indoor camera including: an image capturing unit configured to capture an image of the pet; a storage unit configured to store at least one detection area in association with stagnation times, the detection area that is preset by a user and is a target area for detecting stagnation of the pet, and the stagnation times indicating the number of times when the pet enters the detection area and stagnates in the detection area; and a processor configured to detect a position of the pet and count the stagnation times of the pet in the detection area based on a plurality of captured images captured by the image capturing unit, wherein if determining, based on the plurality of captured images captured by the image capturing unit, that the pet stagnates in the detection area for a predetermined time period or longer, the processor increments and counts the stagnation times of the pet in the detection area and generates an action log including identification information of the detection area and information on the stagnation times.

The present disclose also provides a pet action log recording system including the indoor camera and a terminal apparatus, the indoor camera and the terminal apparatus being connected to communicate with each other, wherein the indoor camera is configured to transmit the stagnation times of the pet in the detection area to the terminal apparatus, and wherein the terminal apparatus is configured to display the received stagnation times of the pet on a monitor.

According to the present disclosure, the action of the pet in the plurality of detection areas set by a user operation can be detected and recorded.

BRIEF DESCRIPTION OF DRAWINGS

FIG. 11 is a diagram illustrating an example of playing back a digest video.

DETAILED DESCRIPTION

Hereinafter, embodiments in which configurations and functions of an indoor camera and an action log recording system according to the present disclosure are specifically disclosed will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided to enable those skilled in the art to fully understand the present disclosure, and are not intended to limit the claimed subject matter.

First Embodiment

Figure 1:
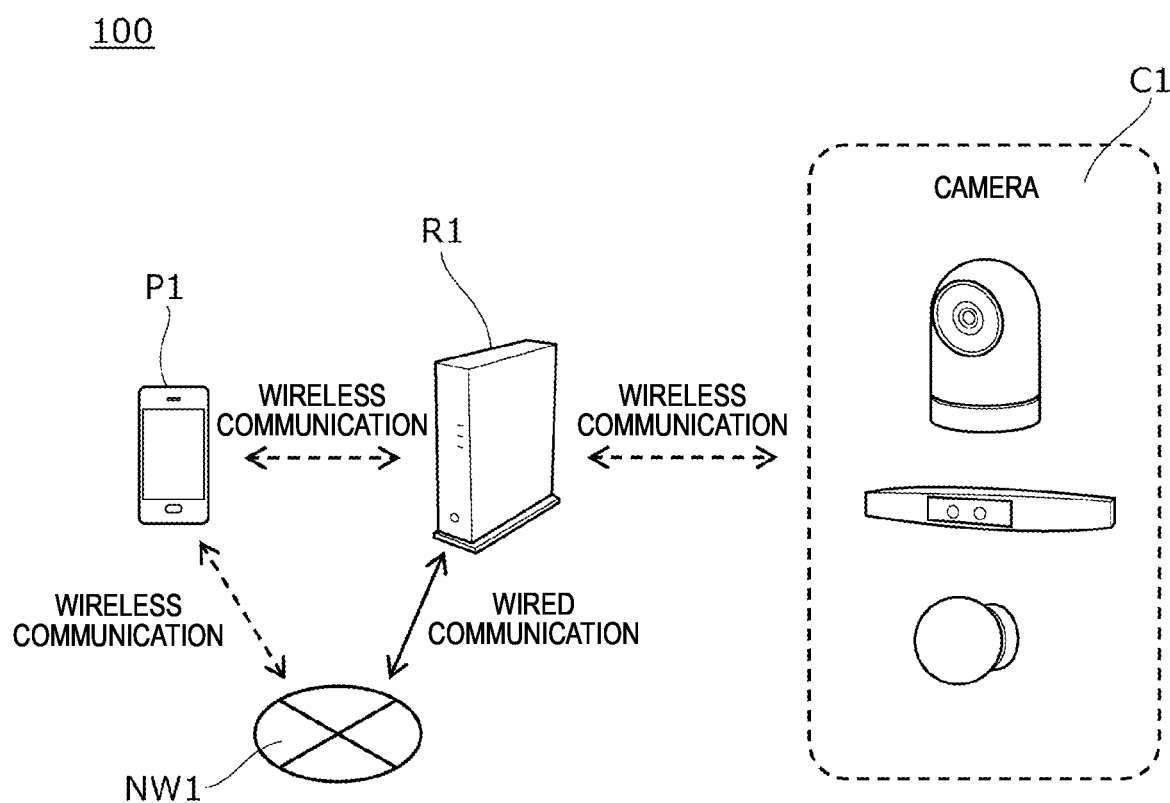
FIG. 1 is a diagram showing an example of an overall configuration of an indoor camera system according to a first embodiment.

FIG. 1 is a diagram showing an example of an overall configuration of an indoor camera system 100 (examples of an action log storage system and a digest video playback system) according to a first embodiment. The indoor camera system 100 includes one or more cameras C1 (examples of indoor cameras) installed in a home, a router R1, a terminal apparatus P1, and a network NW1. Although the indoor camera system 100 according to the first embodiment describes a pet kept at home as an example of a moving object as a use case, the moving object is not limited to a pet and may be, for example, a person such as a child or an elderly person.

At home of a user, the camera C1 and the router R1 are installed. The terminal apparatus P1 is used at the home of the user or outside the home. The camera C1 and the terminal apparatus P1 are connected to communicate with each other by wireless communication from the router R1 installed in the home of the user or the router R1 further via the network NW1.

The camera C1 is connected to communicate with the terminal apparatus P1 via the router R1 or further the network NW1. For example, the camera C1 is installed at a position where the user can capture an image of the moving object at the home of the user so as to capture an image of the moving object in an image capturing region. As shown in FIG. 1, the number of cameras is not limited to one. Further, in the indoor camera system 100 according to the first embodiment, an example in which the camera C1 is a pan tilt (PT) camera is shown, but a type of the camera is not limited thereto and may be, for example, a pan tilt zoom (PTZ) camera, a fixed point camera, or the like.

The camera C1 receives a setting operation of one or more areas (hereinafter, "detection areas") for capturing an image of the moving object by a user operation. When the camera C1 includes a plurality of cameras, the user sets a detection area for each camera by using the terminal apparatus P1.

The detection area referred to here is an area where the moving object performs an action such as a bed, a feeding area, and a playground, and is an image capturing area for confirming a state (an action) of the moving object when the user is absent. The camera C1 receives respective settings of a plurality of detection areas. One of the detection areas is stored as respective rotation angles of a pan motor and a tilt motor when a preset position where the respective rotation angles of the pan motor and the tilt motor are 0 (zero) ° at a position where the camera C1 is installed is set as a reference, and coordinate information (on an image sensor) of an angle of view of the camera C1 at the rotation angles.

The camera C1 includes, in a housing, a plurality of infrared sensors that can detect a position of the moving object, and detects the position of the moving object (heat source) periodically (for example, every 200 ms). The camera C1 drives a driving unit 16 (see FIG. 2) to the position of the moving object (the heat source) based on a detection result detected by the plurality of infrared sensors so as to capture an image while tracking the moving object. The camera C1 determines that a region where a change amount of brightness is equal to or larger than a predetermined change amount in a plurality of captured images captured continuously is a moving object. When there is the region where the change amount of the brightness is equal to or larger than the predetermined change amount, the camera C1 determines that a moving object has been detected and records a captured video. Further, when a position of the detected moving object is positioned in the detection area, the camera C1 determines that the moving object is within the detection area. The number of infrared sensors provided in the camera C1 may be one. Further, although an example in which the camera C1 according to the first embodiment captures an image while tracking a moving object is shown, capturing the image while tracking the moving object is not an essential function.

The terminal apparatus P1 is an apparatus operated by the user and is implemented by, for example, a smartphone, a tablet terminal, or a personal computer (PC). The terminal apparatus P1 receives an action log or the like including a recorded video from the camera C1 and displays the action log or the like on a monitor. Further, the terminal apparatus P1 may receive and display (perform stream playback of) a live video captured by the camera C1 based on a user operation. The terminal apparatus P1 is connected to communicate with the camera C1 via the router R1 or the router R1 further via the network NW1.

The network NW1 is connected between the router R1 and the terminal apparatus P1 such that wireless communication or wired communication is enabled. The wireless communication referred to here is, for example, near field wireless communication such as Bluetooth (registered trademark) or NFC (registered trademark), or communication via a wireless local area network (LAN) such as Wi-Fi (registered trademark).

Figure 2:
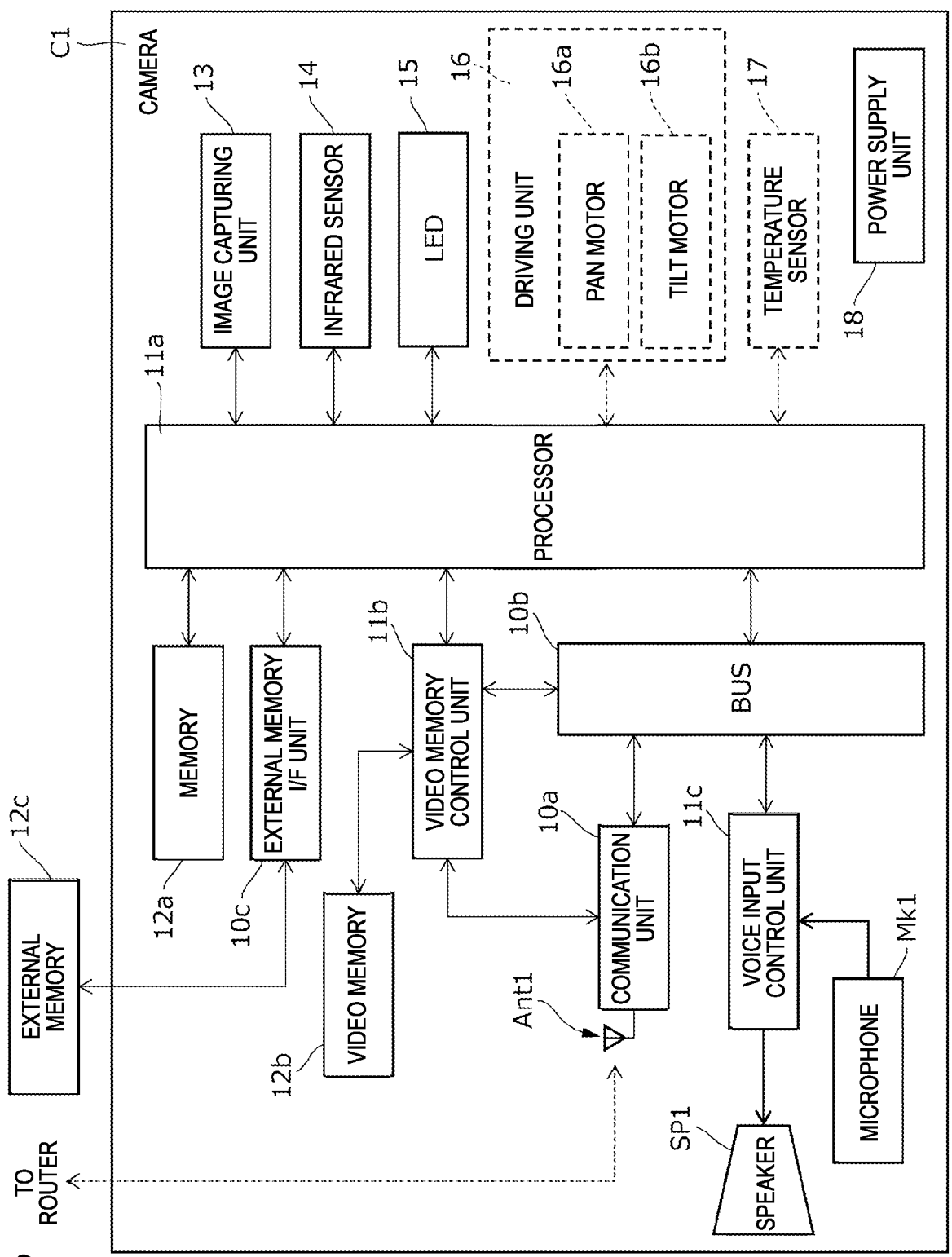
FIG. 2 is a diagram showing an example of an internal configuration of a camera in the indoor camera system according to the first embodiment.

FIG. 2 is a diagram showing an example of an internal configuration of the camera C1 in the indoor camera system 100 according to the first embodiment. The camera C1 as an example of the indoor camera shown in FIG. 1 has substantially the same configuration. The camera C1 includes at least a communication unit 10a, a processor 11a, a memory 12a, an image capturing unit 13, and a power supply unit 18.

The communication unit 10a includes an antenna Ant1, is connected to the router R1 such that wireless communication is enabled, and transmits and receives data to and from the terminal apparatus P1 via the router R1 or the network NW1. The communication unit 10a may be connected to the router R1 such that wired communication is enabled.

A BUS 10b inputs and outputs data among the communication unit 10a, the processor 11a, a video memory control unit 11b, and a voice input control unit 11c.

An external memory interface (IN) unit 10c can communicate with an external memory 12c that is an example of a storage medium such as a universal serial bus (USB) memory or an SD card, and is provided so that the external memory 12c such as the USB memory or the SD card can be inserted and removed. The external memory I/F unit 10c may be connectable to a plurality of external memories at the same time.

The processor 11a is configured using, for example, a central processing unit (CPU) or a field programmable gate array (FPGA), and cooperates with the memory 12a to perform various processings and control. Specifically, the processor 11a refers to a program and data held in the memory 12a and executes the program to implement a function of detecting a position of the moving object, a function of tracking and then capturing an image of the moving object, a function of performing imaging by tracking the moving object, a function of counting action logs of the moving object for each detection area, and the like. Further, the processor 11a implements a function of generating an action log including information on stagnation times of the moving object detected at each interval (for example, one day) set by a user operation, identification information of the detection area (for example, a name of each detection area), and a recorded video obtained by capturing an image of the moving object that stagnates (stays) in the detection area.

The processor 11a generates meta information including a recording start time, information on a detection area, a timing of stagnation Flag ON, a timing of stagnation Flag OFF, a stagnation count-up completion timing, a recording length, and the like, which show an outline of data of a recorded video recorded in the memory 12a. The term "stagnation" referred in the present embodiment is used, for example, in a meaning including stay of the moving object in the detection area. However, the term "stagnation" as used herein is not limited to the "stay", and may be used in a meaning including entry into the detection area, movement within the detection area, an action, and the like. The processor 11a includes meta information generated in a recorded video and causes the memory 12a and the video memory control unit 11b to record the meta information. When receiving, from the terminal apparatus P1, a signal designating the external memory 12c as a recording destination of the recorded video by a user operation, the processor 11a transmits the recorded video including the meta information to the external memory 12c via the external memory I/F unit 10c and causes the external memory 12c to record the recorded video.

When the recorded video captured by the image capturing unit 13 is input from the processor 11a, the video memory control unit 11b records the recorded video in a video memory 12b.

The voice input control unit 11c converts a sound (a voice) collected by a microphone Mk1 into an electric signal and outputs the electric signal to the processor 11a. Further, the voice input control unit 11c inputs an electric signal input from the BUS 10b to a speaker SP1. The speaker SP1 converts the electric signal input from the voice input control unit 11c into a sound (a voice) to output the sound (the voice).

The memory 12a that is an example of a storage unit includes, for example, a random access memory (RAM) that serves as a work memory used when executing various processings of the processor 11a, and a read only memory (ROM) that stores data and a program that specifies an operation of the processor 11a. Data or information generated or obtained by the processor 11a is temporarily stored in the RAM. A program that specifies an operation of the processor 11a is written in the ROM. The memory 12a stores a preset position of the camera C1, the recorded video, the detection area where the moving object is detected, action log times for each detection area, or the like. The memory 12a manages an image capturing date based on date information included in the data "recording start time" in the meta information (see FIG. 4) of the recorded video.

The video memory 12b, which is an example of the storage unit, records a captured video captured by the image capturing unit 13 as a recorded video for each image capturing date. The video memory 12b manages an image capturing date based on the date information included in the data "recording start time" included in the meta information generated by the processor 11a.

The external memory 12c, which is an example of the storage unit, is a storage medium such as a so-called USB memory or an SD card and records the captured video captured by the image capturing unit 13. Although FIG. 2 shows an example in which the camera C1 includes one external memory I/F unit 10c and one external memory 12c, a plurality of external memory I/F units 10c and a plurality of external memories 12c may be used. The external memory 12c manages an image capturing date based on the date information included in the data "recording start time" included in the meta information generated by the processor 11a.

The image capturing unit 13 includes at least a lens (not shown) and an image sensor (not shown). The image sensor is a solid-state image capturing element such as a charged-coupled device (CCD) or a complementary metal-oxide-semiconductor (CMOS), and converts an optical image formed on an image capturing surface into an electric signal. The image capturing unit 13 outputs the captured video to the processor 11a.

Infrared sensors 14, which are examples of sensors, are so-called human-presence sensors provided in the camera C1 in plurality (for example, two) and are passive infra red (PIR) sensors. The number of infrared sensors 14 may be one. The plurality of infrared sensors 14 detect a heat source in a maximum image capturing region that can be captured from an image capturing position of the image capturing unit 13 that can be driven by the driving unit 16. The plurality of infrared sensors 14 output a position of the detected heat source (hereinafter, referred to as a heat source position) to the processor 11a as a detection result.

The processor 11a generates a control signal for driving the driving unit 16 (that is, a pan motor 16a or a tilt motor 16b) so that the image capturing region of the image capturing unit 13 can capture an image of the heat source position based on the detection result input from the plurality of infrared sensors 14, and outputs the generated control signal to the driving unit 16. The processor 11a determines whether there is a region where a change amount of brightness is equal to or larger than a predetermined change amount in a plurality of captured images continuously captured by the image capturing unit 13. When there is the region where the change amount of the brightness is equal to or larger than the predetermined change amount, the processor 11a determines that a moving object has been detected and starts recording a captured video. Further, the processor 11a may start recording the captured video by including a captured video captured within a predetermined time period (for example, 10 seconds, 20 seconds, or the like) since a timing at which the detection of the moving object is determined.

The processor 11a periodically repeats a determination processing for detecting the moving object, for example, every 200 ms. Further, the processor 11a repeatedly determines whether a position of the detected moving object is within the set detection area. The determination processing that is for detecting the moving object and is executed by the processor 11a may be executed, for example, every 100 ms, or may be executed every 300 ms.

When determining that the detection result obtained as a result of the determination processing satisfies a predetermined detection condition, the processor 11a sets a stagnation Flag to an ON state and starts counting up a stagnation time period when the moving object stagnates in the detection area.

Here, the predetermined detection condition will be described. The detection condition is a condition such that the position of the moving object is in a detection area Ar1 a predetermined number of consecutive times (for example, two times, three times, or five times), or the position of the moving object is positioned in the detection area Ar1 at a predetermined ratio (for example, two or three times out of five times), for example, in detection results periodically obtained by the processor 11a. When determining that the continuously obtained detection results satisfy the predetermined detection condition, the processor 11a determines that the moving object is within the detection area and sets the stagnation flag to the ON state.

When a counted-up stagnation time period reaches a predetermined time period (for example, fifteen seconds), the processor 11a increments and counts the stagnation times of the moving object in the detection area.

When determining that the moving object has gone out of the detection area based on determination results of the change amount of the brightness in a plurality of captured images, the processor 11a sets the stagnation Flag to an OFF state. In a case where the counted-up stagnation time period has not reached a predetermined time period (for example, fifteen seconds) when the stagnation Flag is set to the OFF state, the processor 11a erases the captured video captured by the image capturing unit 13 without recording the captured video. Further, in a case where the counted-up stagnation time period has reached the predetermined time period (for example, fifteen seconds) when the stagnation Flag is set to the OFF state, the processor 11a records the captured video captured by the image capturing unit 13 without erasing the captured video.

The processor 11a records a captured video during a period from a time when the stagnation Flag is set to the OFF state until a predetermined time period (for example, ten seconds, thirty seconds, or one minute) has elapsed. That is, the recorded video is recorded during a period from a timing at which the processor 11a determines that the change amounts of the brightness of the plurality of captured images are larger than the predetermined change amount and the moving object has been detected in the image capturing region until the predetermined time period has elapsed after the stagnation Flag is set to the OFF state. When the stagnation Flag is set to the ON state again in any one of the detection areas during a period from the time when the stagnation Flag is set to the OFF state until the predetermined time period has elapsed (that is, when it is determined that the moving object is detected and the detection result satisfies the predetermined detection condition), the processor 11a continues (extends) recording of the captured video without ending the recording of the captured video even after the predetermined time period has elapsed and starts counting up the detection area stagnation time period again. When a counted-up stagnation time period reaches a predetermined time period (for example, fifteen seconds), the processor 11a increments and counts the stagnation times of the moving object in the detection area. The predetermined time period described above may be set to an optional time period by a user operation.

A light emitting diode (LED) 15 illuminates the image capturing region of the image capturing unit 13 when it is dark indoors and it is not suitable for capturing an image of the moving object, for example, at night, on an early morning, or in rain. The LED 15 is turned on or off by a user operation received from the terminal apparatus P1. The image capturing unit 13 captures a black-and-white image while the LED 15 is turned on.

The driving unit 16 supports the image capturing unit 13 such that pan rotation and tilt rotation are enabled, and drives at least one of the pan motor 16a and the tilt motor 16b based on the control signal input from the processor 11a.

The pan motor 16a pan-rotates the image capturing unit 13 based on the control signal of the processor 11a to change the image capturing region of the image capturing unit 13.

The tilt motor 16b tilt-rotates the image capturing unit 13 based on the control signal of the processor 11a to change the image capturing region of the image capturing unit 13.

A temperature sensor 17 is a sensor that can measure an air temperature (a room temperature) in a room where the camera C1 is installed. The temperature sensor 17 outputs air temperature data serving as a measurement result to the processor 11a. The processor 11a stores the air temperature data input from the temperature sensor 17 in the memory 12a and transmits the air temperature data to the terminal apparatus P1 via the communication unit 10a.

The power supply unit 18 supplies power to the camera C1 from an external commercial power supply. The power supply unit 18 may directly obtain a power supply from the external commercial power supply. Further, the power supply unit 18 may include a battery that can accumulate electric charges supplied from the external commercial power supply, may have a detachable configuration, may be disconnected from the external commercial power supply, or may be supply power to the camera C1.

Figure 3:
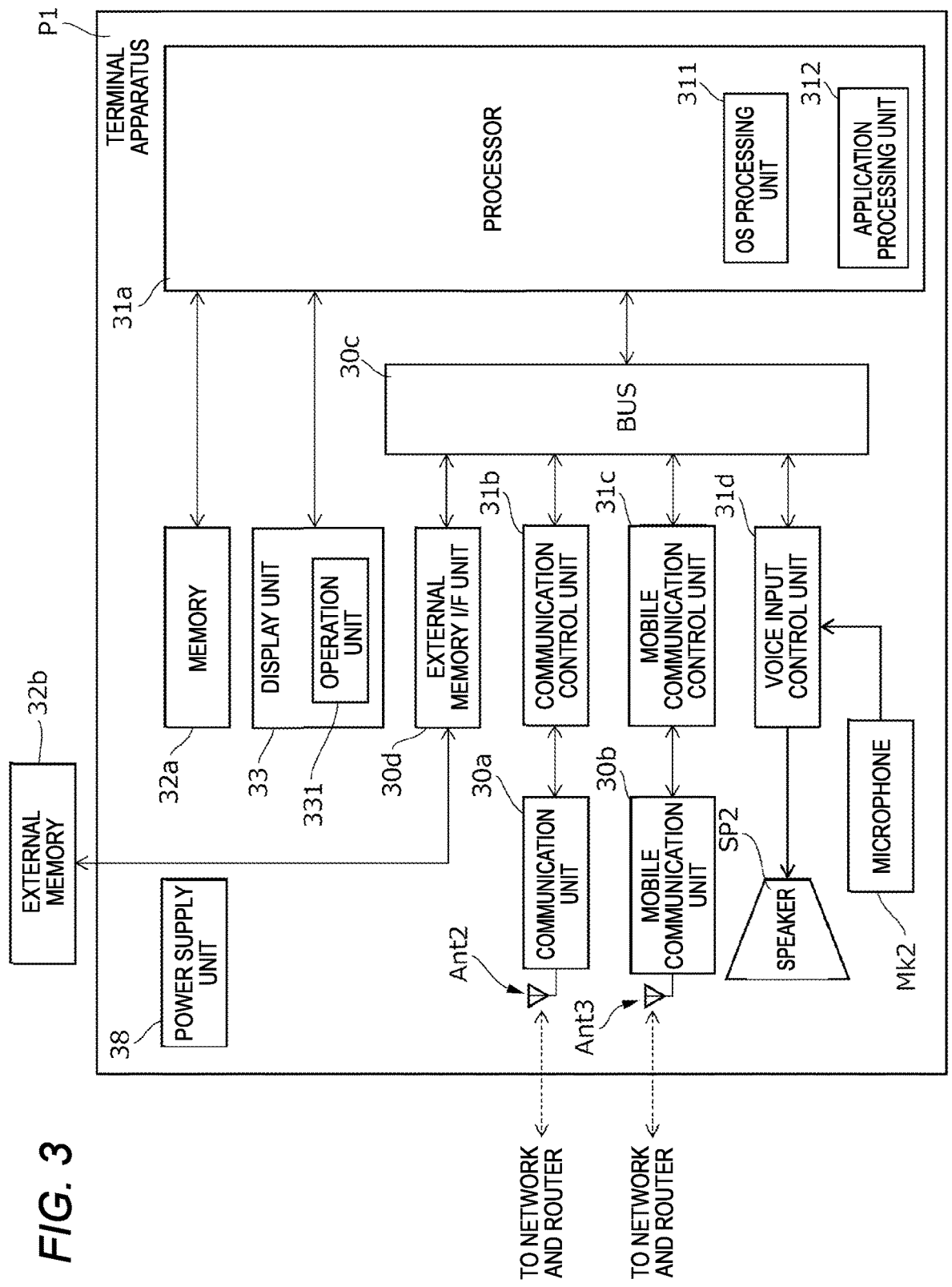
FIG. 3 is a diagram showing an example of an internal configuration of a terminal apparatus in the indoor camera system according to the first embodiment.

FIG. 3 is a diagram showing an example of an internal configuration of the terminal apparatus P1 in the indoor camera system 100 according to the first embodiment. The terminal apparatus P1 includes at least a communication unit 30a, a mobile communication unit 30b, a processor 31a, a memory 32a, a display unit 33, and a power supply unit 38.

The communication unit 30a includes an antenna Ant2, and is connected to the router R1 or the network NW1 such that wireless communication is enabled. The communication unit 30a transmits and receives data to and from the terminal apparatus P1 via the router R1 or the network NW1.

The mobile communication unit 30b includes an antenna Ant3, and is connected to the router R1 or the network NW1 such that wireless communication is enabled, in a communication terminal (for example, the smartphone, the tablet terminal, a PC that can be transported) that can be moved by being carried or transported by the user. The mobile communication unit 30b transmits and receives data to and from the terminal apparatus P1 via the router R1 or the network NW1.

The BUS 30c inputs and outputs data among the processor 31a, a communication control unit 31b, a mobile communication control unit 31c, and a voice input control unit 31d.

An external memory I/F unit 30d can communicate with an external memory 32b that is an example of a storage medium such as a universal serial bus (USB) memory or an SD card, and is provided so that the external memory 32b such as the USB memory or the SD card can be inserted and removed. The external memory I/F unit 30d may connect a plurality of external memories at the same time.

The processor 31a is configured using, for example, a CPU or an FPGA, and cooperates with the memory 32a to perform functions and control of units. The units referred to here are, for example, an operating system (OS) processing unit 311 and an application processing unit 312. Based on a user operation received by an operation unit 331, the processor 31a refers to a program and data held in the memory 32a and executes the program so as to execute the functions of the operating system (OS) processing unit 311 and the application processing unit 312.

The OS processing unit 311 is, for example, Windows (registered trademark), Mac OS (registered trademark), iOS (registered trademark), Linux (registered trademark), or Android (registered trademark), receives an input signal based on the user operation received by the operation unit 331, and performs various processings and control. Specifically, the OS processing unit 311 executes a function of displaying a character input by a user operation on the display unit 33, a function of displaying, on the display unit 33, a cursor or the like indicating an operation or a selection position of the operation unit 331 such as a mouse, a keyboard or a touch panel, and the like. The OS processing unit 311 receives, for example, a range selection operation of the detection area by a user, an input operation of a designated period of an image capturing date of a recorded video for executing digest playback, and the like, and displays a received operation content on the display unit 33.

The application processing unit 312 is activated based on a user operation, and cooperates with the memory 32a to perform functions and control of the units. Specifically, the application processing unit 312 receives the recorded video recorded by the camera C1 and the action log and displays the received recorded video and action log on the display unit 33. Further, the application processing unit 312 executes a function of turning on or off the LED 15 of the camera C1, a function of driving the pan motor 16a or the tilt motor 16b, a function of recording the recorded video in the external memory 12c, and the like based on a user operation.

The communication control unit 31b executes control of the communication unit 30a, and transmits and receives image data or voice data to and from the camera C1 via the router R1 connected to enable wireless communication.

The mobile communication control unit 31c executes control of the mobile communication unit 30b, and transmits and receives image data or voice data to and from the camera C1 via the router R1 connected to enable wireless communication or the router R1 connected via the network NW1.

The voice input control unit 31d converts a sound (for example, a voice of the user) collected by the microphone Mk2 into an electric signal and outputs the converted electric signal to the processor 31a. Further, the voice input control unit 31d inputs an electric signal input from the BUS 30c to a speaker SP2. The speaker SP2 converts the voice signal input from the voice input control unit 31d into a sound (a voice) and outputs the converted sound (voice).

The memory 32a includes, for example, a RAM that serves as a work memory used when executing processings of the processor 31a, and a ROM that stores data and a program that specifies an operation of the processor 31a. Data or information generated or obtained by the processor 31a is temporarily stored in the RAM. A program that specifies an operation of the processor 31a is written in the ROM.

The external memory 32b is a storage medium such as a so-called USB memory or SD card, and records a recorded video received from the camera C1. Although FIG. 3 shows an example in which the terminal apparatus P1 includes one external memory I/F unit 30d and one external memory 32b, the external memory I/F unit 30d and the external memory 32b may be plural.

The display unit 33 that is an example of a monitor is configured using, for example, a liquid crystal display (LCD) or an organic electroluminescence (EL). The display unit 33 displays a setting screen for setting the detection area of the camera C1, a recorded video or a live video received from the camera C1, or the like by performing stream playback. Further, the display unit 33 may be a touch interface provided in the terminal apparatus P1 and configured by a touch panel. In such a case, the display unit 33 has a function of the operation unit 331, receives an input operation of the user, and outputs a result of the input operation by the user to the processor 31a.

The operation unit 331 is, for example, a user interface that detects an input operation of the user, and is configured using a mouse, a keyboard, a touch panel, or the like. Based on the input operation of the user, the operation unit 331 receives input of the detection area, designation of an image capturing date for executing digest playback, or the like, converts the received input of the detection area, the received designation of the image capturing date, or the like into an input signal, and outputs the converted input signal to the OS processing unit 311 of the processor 11a.

The power supply unit 38 supplies power to the terminal apparatus P1 from an external commercial power supply or a battery that can accumulate electric charges supplied from the external commercial power supply. The battery may have a detachable configuration, may be disconnected from the external commercial power supply, or may supply power to the terminal apparatus P1.

Figure 4:
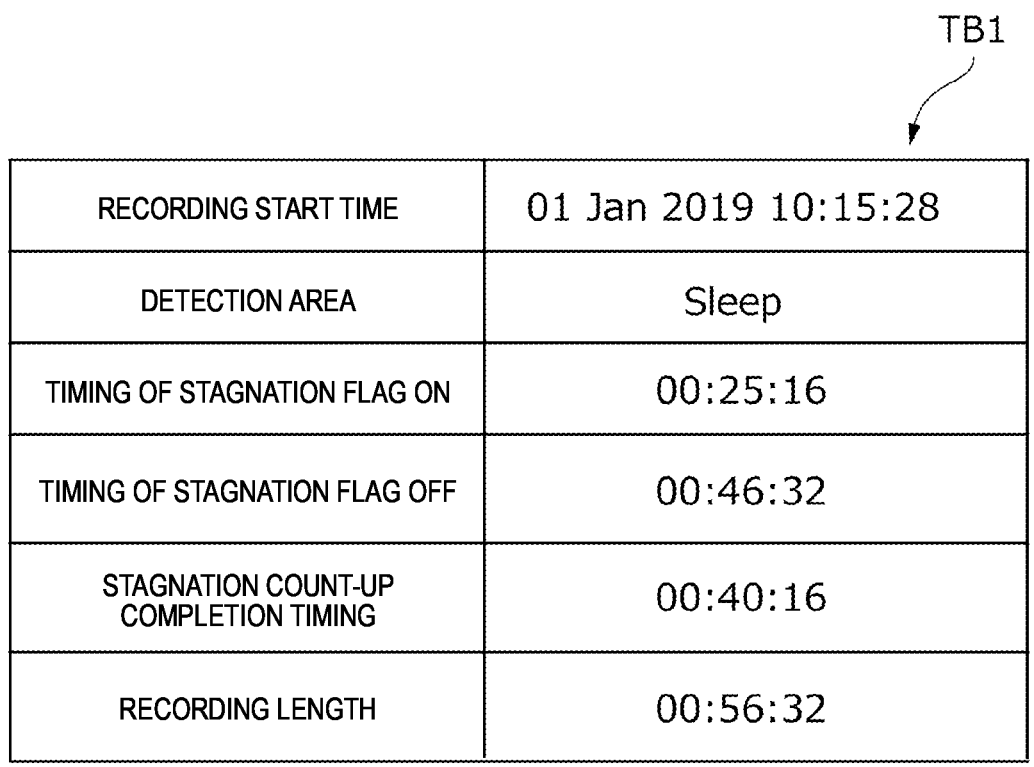
FIG. 4 is a table showing an example of meta information.

FIG. 4 is a table showing an example of meta information TB1. The meta information TB1 is data showing an outline of data of a recorded video and is generated by the processor 11a. The meta information TB1 is data that is given to the captured video captured by the image capturing unit 13 and recorded together as a recorded video.

The meta information TB1 is generated including respective data of the recording start time, the detection area, the timing of stagnation Flag ON, the timing of stagnation Flag OFF, the stagnation count-up completion timing, and the recording length, which show the outline of the data of the recorded video.

The data "recording start time" indicates a time at which recording of a video is started, and is data indicating a time at which the processor 11a detects that the moving object has entered the predetermined detection area. The data "recording start time" includes information on an image capturing date and is stored as, for example, "1 Jan. 2019 10:15:28".

The data "detection area" is data indicating a name of the detection area where the detected moving object is positioned. The data "detection area" is stored as, for example, "Sleep".

The data "timing of stagnation Flag ON" is data indicating an elapsed time period during which the stagnation Flag is set to the ON state with reference to the recording start time. The data "timing of stagnation Flag ON" is stored as, for example, "00:25:16".

The data "timing of stagnation Flag OFF" is data indicating a time at which the stagnation Flag is set to the "OFF state" with reference to the recording start time. The data "timing of stagnation Flag OFF" is stored as, for example, "00:46:32".

The data "timing of stagnation count-up" is data indicating a time at which count-up (for example, ten seconds, fifteen seconds) of a stagnation time period of the moving object in the detection area is completed. The data "timing of stagnation count-up" is stored as, for example, "00:40:16".

The data "recording length" is data indicating a length of a recording time period of a recorded video. The data "recording length" is stored as, for example, "00:56:32".

When the moving object is detected in the plurality of detection areas at different image capturing times in data of one recorded video, the meta information TB1 may be generated including a plurality of pieces of data in which the "timing of stagnation Flag ON", the "timing of stagnation Flag OFF", and the "timing of stagnation count-up" are associated with each other for each information on a detection area where the moving object is detected.

Figure 5:
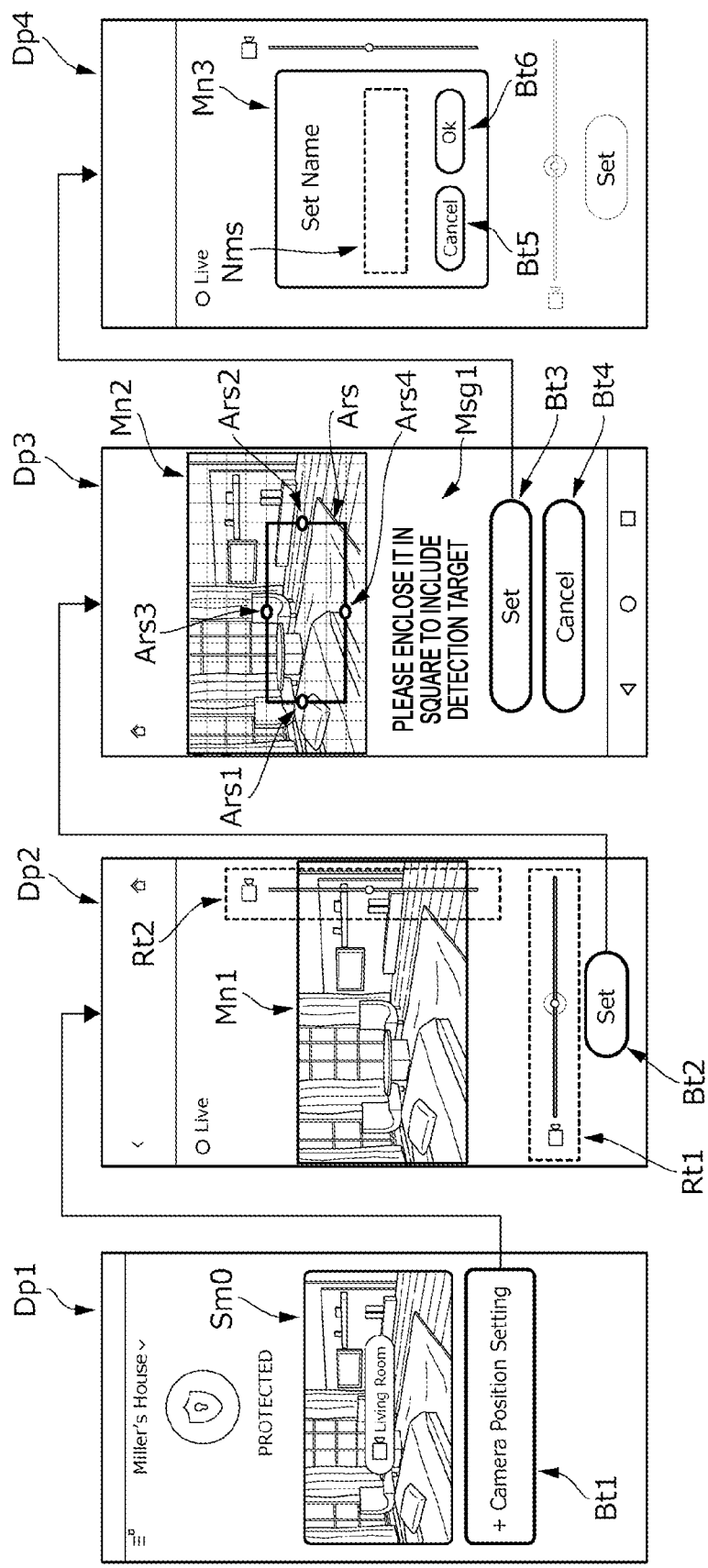
FIG. 5 is a diagram illustrating an example of setting a detection area.

FIG. 5 is a diagram illustrating an example of setting the detection area. Although FIG. 5 describes an example in which one detection area is set by a user operation, a plurality of detection areas may be set.

A screen Dp1 is a screen in which the application processing unit 312 is activated by a user operation. The screen Dp1 is generated including a thumbnail Sm0 and a detection area setting button Bt1 and is displayed on the display unit 33.

The thumbnail Sm0 is an image obtained by converting a captured image obtained lastly from the camera C1 by the terminal apparatus P1 into a thumbnail. When a display region of the thumbnail Sm0 is pressed (selected) by a user operation, the terminal apparatus P1 generates a request signal that requests a live video currently captured by the camera C1, transmits the generated request signal to the camera C1, and shifts to a screen (not shown) that displays the live video received from the camera C1. Further, the detection area setting button Bt1 is pressed (selected) by a user operation when a new detection area is set or when an existing detection area is edited. When the detection area setting button Bt1 is pressed (selected) by a user operation, the terminal apparatus P1 generates a screen Dp2 and displays the generated screen Dp2 on the display unit 33.

The screen Dp2 is generated including a pan rotation slider Rt1, a tilt rotation slider Rt2, a setting button Bt2, and a live video display region Mn1, and is displayed on the display unit 33.

The pan rotation slider Rt1 is a slide bar for rotating the pan motor 16a of the camera C1. The pan rotation slider Rt1 indicates a preset position (that is, a rotation angle of the pan motor is 0 (zero)°) when the camera C1 is installed at a center position of the slide bar. When the user operates the slide bar in a left-right direction, the terminal apparatus P1 calculates a rotation angle of the pan motor corresponding to an operation distance between a position of the slide bar after the operation and the center position, generates a control signal including the rotation angle, and transmits the generated control signal to the camera C1.

The tilt rotation slider Rt2 is a slide bar for rotating the tilt motor 16b of the camera C1. The tilt rotation slider Rt2 indicates a preset position (that is, a rotation angle of the tilt motor is 0 (zero)°) when the camera C1 is installed at a center position of the slide bar. When the user operates the slide bar in an upper-lower direction, the terminal apparatus P1 calculates a rotation angle of the tilt motor corresponding to an operation distance between a position of the slide bar after the operation and the center position, generates a control signal including the rotation angle, and transmits the generated control signal to the camera C1.

The live video display region Mn1 displays a live video of a current image capturing region captured by the image capturing unit 13. The user operates the pan rotation slider Rt1 or the tilt rotation slider Rt2 to change an image capturing region such that the image capturing region of the image capturing unit 13 reflected in the live video display region Mn1 includes a detection area where the moving object is desired to be detected. When the setting button Bt2 is pressed (selected) by a user operation, the terminal apparatus P1 generates a screen Dp3 using a captured image that is transmitted from the camera C1 and captured by the image capturing unit 13, and displays the generated screen Dp3 on the display unit 33.

The screen Dp3 is generated including a detection area setting screen Mn2, a detection area Ars, a setting button Bt3, and a return button Bt4.

The detection area setting screen Mn2 is displayed by superimposing the detection area Ars indicating a range of a detection area to be set. The detection area Ars is a rectangular area that passes through a plurality of area range markers Ars1, Ars2, Ars3, and Ars4. The detection area Ars is enlarged/reduced in accordance with positions of the plurality of area range markers Ars1 to Ars4 selected by the user so as to include, for example, a bed and a feeding area (table) for which the moving object is desired to be detected. Although the detection area Ars shown in FIG. 5 is rectangular, the present invention is not limited thereto. For example, the detection area Ars may be a polygonal area that passes through three or more or five or more area range markers.

The detection area setting screen Mn2 of the screen Dp3 shows an example in which a plurality of detection regions where the processor 11a can detect the change amount of the brightness from a captured image captured by the image capturing unit 13 are displayed in a lattice shape. The processor 11a detects the moving object based on respective change amounts of brightness of the detection regions. The plurality of detection regions may not be displayed. Further, as the plurality of detection regions that can be detected by the processor 11a, detection regions corresponding to performance of the processor 11a and a depth or a width of an image capturing region may be displayed.

A message Msg1 is a message notified to the user regarding setting of the detection area Ars, and is displayed in FIG. 5 as "Please enclose it in a square so as to include a detection target". It is needless to say that the message Msg1 shown in FIG. 5 is an example and is not limited thereto.

When the setting button Bt3 is pressed (selected) by a user operation, the terminal apparatus P1 transmits, to the camera C1, coordinate information of the detection area Ars of the image capturing region displayed on the detection area setting screen Mn2. Further, the terminal apparatus P1 generates a screen Dp4 where a name of the set detection area Ars is set, and displays the generated screen Dp4 on the display unit 33.

When the return button Bt4 is pressed (selected) by a user operation, the terminal apparatus P1 returns to the screen Dp2 and receives setting of rotation angles of the pan motor and the tilt motor (that is, setting of an image capturing region) again.

The screen Dp4 is generated including a detection area name input screen Mn3, a name input field Nms, a return button Bt5, and a setting button Bt6.

The detection area name input screen Mn3 includes the name input field Nms, the return button Bt5, and the setting button Bt6. The terminal apparatus P1 receives input of a name that enables identification of a detection area set by the user in the name input field Nms.

When the setting button Bt6 is pressed (selected) by a user operation, the terminal apparatus P1 sets a name of the detection area set on the screen Dp2 to a name input to the name input field Nms. When the setting button Bt6 is pressed (selected) without inputting anything in the name input field Nms by the user, the terminal apparatus P1 automatically sets the name of the detection area by using a temporary name such as "preset 1" or "preset 2". Accordingly, the terminal apparatus P1 can identify a set detection area and other detection areas by using different names.

On the other hand, when the return button Bt5 is pressed (selected) by a user operation, the terminal apparatus P1 automatically sets the name of the detection area set on the screen Dp2 by using a temporary name such as "preset 1" or "preset 2".

Figure 6:
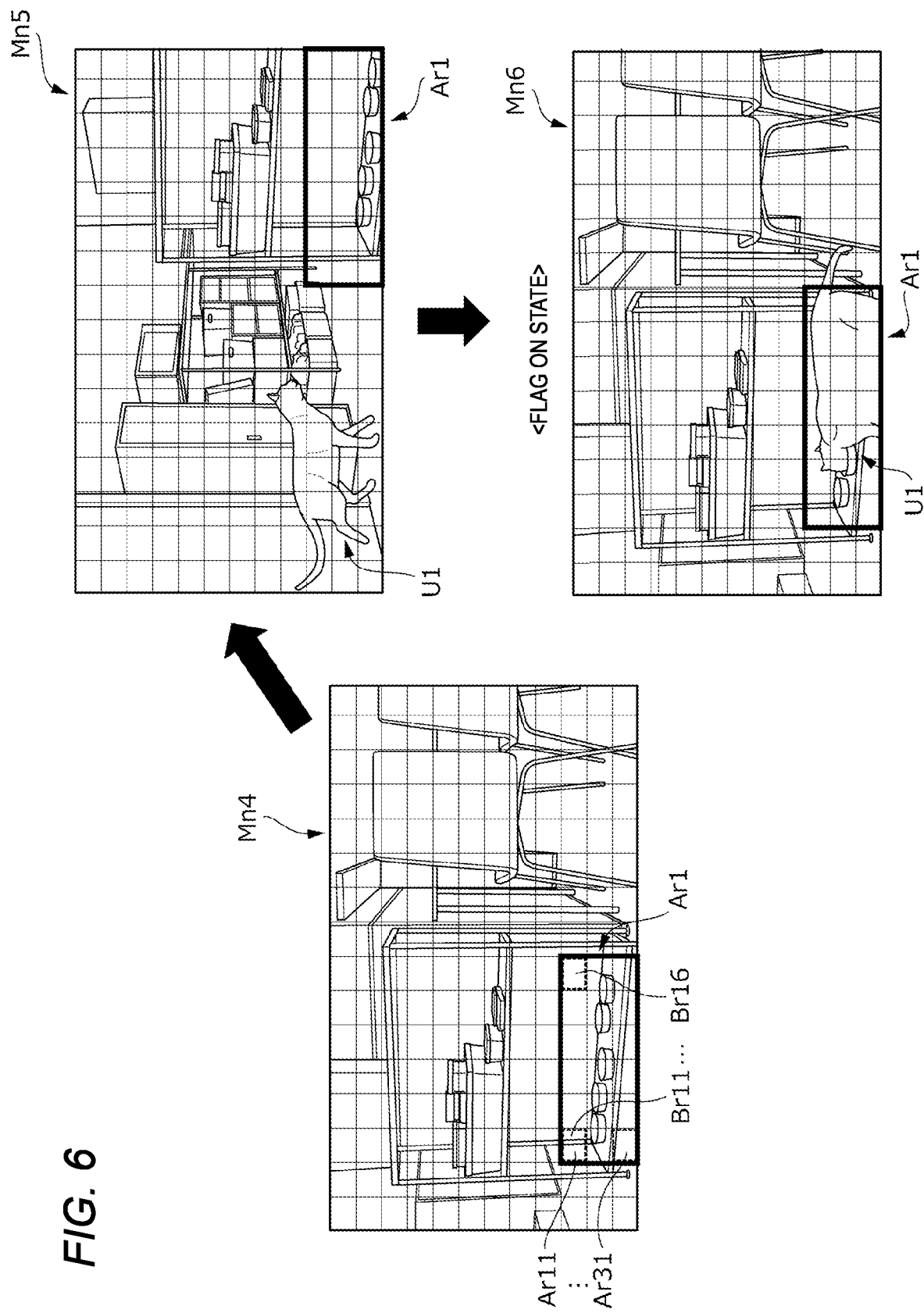
FIG. 6 is a diagram illustrating a shift of a stagnation flag from an OFF state to an ON state.

FIG. 6 is a diagram illustrating a shift of the stagnation flag from the OFF state to the ON state. FIG. 6 describes an example of detecting a cat that is an example of the moving object.

A screen Mn4 shows an image capturing region where the detection area Ar1 is set. The detection area Ar1 is an area including a plurality of detection regions (regions indicated by columns Ar11 . . . Ar31 and rows Br11 . . . Br16, respectively) where the processor 11a can detect the moving object.

On a screen Mn5, the processor 11a detects a body temperature of a cat U1 as a heat source. The processor 11a drives the driving unit 16 based on a heat source position detected by the infrared sensor 14, and detects the moving object (the cat U1) based on respective change amounts of brightness of a plurality of captured images captured by the image capturing unit 13. On the screen Mn5, the processor 11a determines that a position of the detected moving object (the cat U1) has not entered the detection area Ar1 and leaves the stagnation Flag in the OFF state.

The processor 11a on a screen Mn6 detects entry of the cat U1 into the detection area Ar1. Specifically, the processor 11a periodically (for example, every 200 ms) detects the respective change amounts of the brightness of the plurality of captured images captured by the image capturing unit 13, and obtains a detection result as respective positions of the moving object of regions where the change amount of the brightness is larger than a predetermined threshold. Further, when the change amount of the brightness is larger than the predetermined threshold, the processor 11a generates a control signal that starts recording of a video and outputs the generated control signal to the image capturing unit 13. Further, when determining that the predetermined detection condition is satisfied based on the detection result, the processor 11a sets the stagnation Flag from the OFF state to the ON state and starts counting up the stagnation time period.

Figure 7:
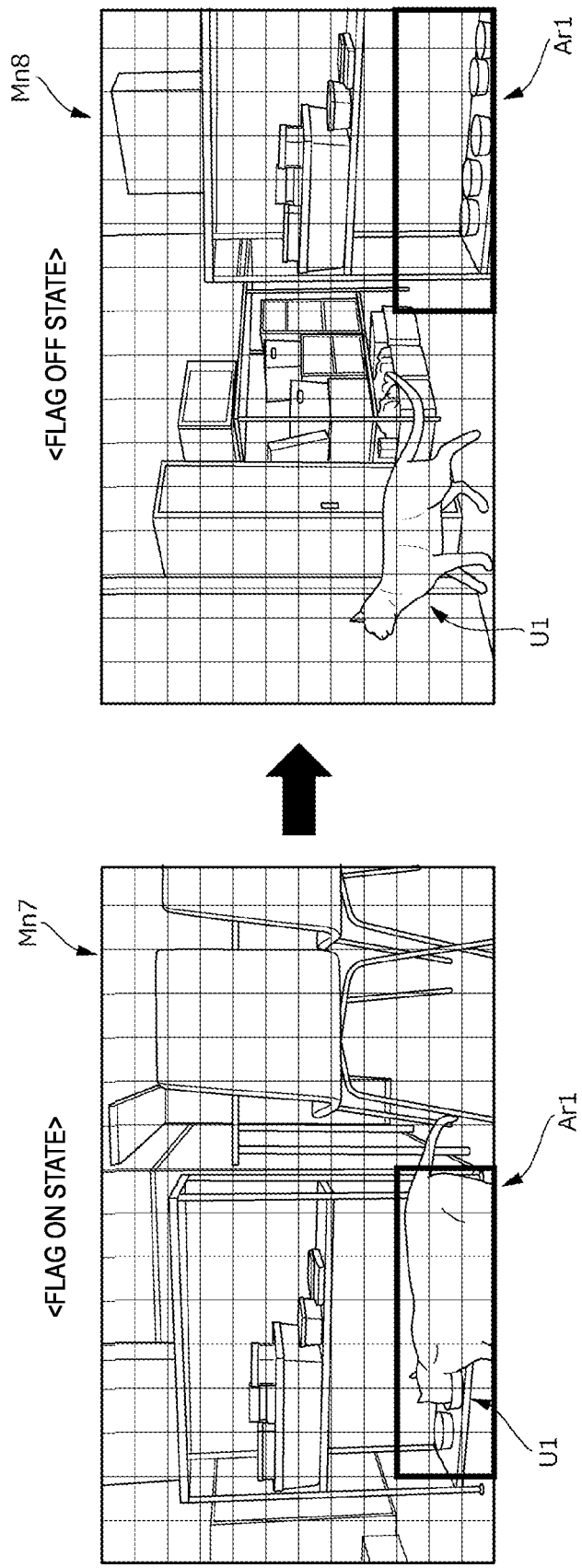
FIG. 7 is a diagram illustrating a shift of the stagnation Flag from the ON state to the OFF state.

FIG. 7 is a diagram illustrating a shift of the stagnation Flag from the ON state to the OFF state. FIG. 7 describes an example of detecting the cat U1 that is an example of the moving object.

The processor 11a on a screen Mn7 determines that the cat U1 stagnates in the detection area Ar1, sets the stagnation Flag to the ON state, and counts up the stagnation time period.

The processor 11a on a screen Mn8 periodically determines whether there is a region where the change amount of the brightness is larger than the predetermined threshold, and obtains a determined region as a position of the cat U1. The processor 11a determines whether the cat U1 has moved out of the detection area Ar1 based on the obtained position of the cat U1. In FIG. 7, the processor 11a determines that the cat U1 does not stagnate in the detection area Ar1 based on the detection result, and sets the stagnation Flag from the ON state to the OFF state. At this time, when the counted-up stagnation time period is equal to or larger than a set stagnation time period (for example, fifteen seconds), the processor 11a increments and counts stagnation times of the cat U1 in the detection area Ar1, and generates an action log including identification information of the detection area (for example, a name) and information on the stagnation times. The generated action log is stored in the memory 12a, and is transmitted to the terminal apparatus P1 at an interval (for example, each day) set by a user operation.

Figure 8:
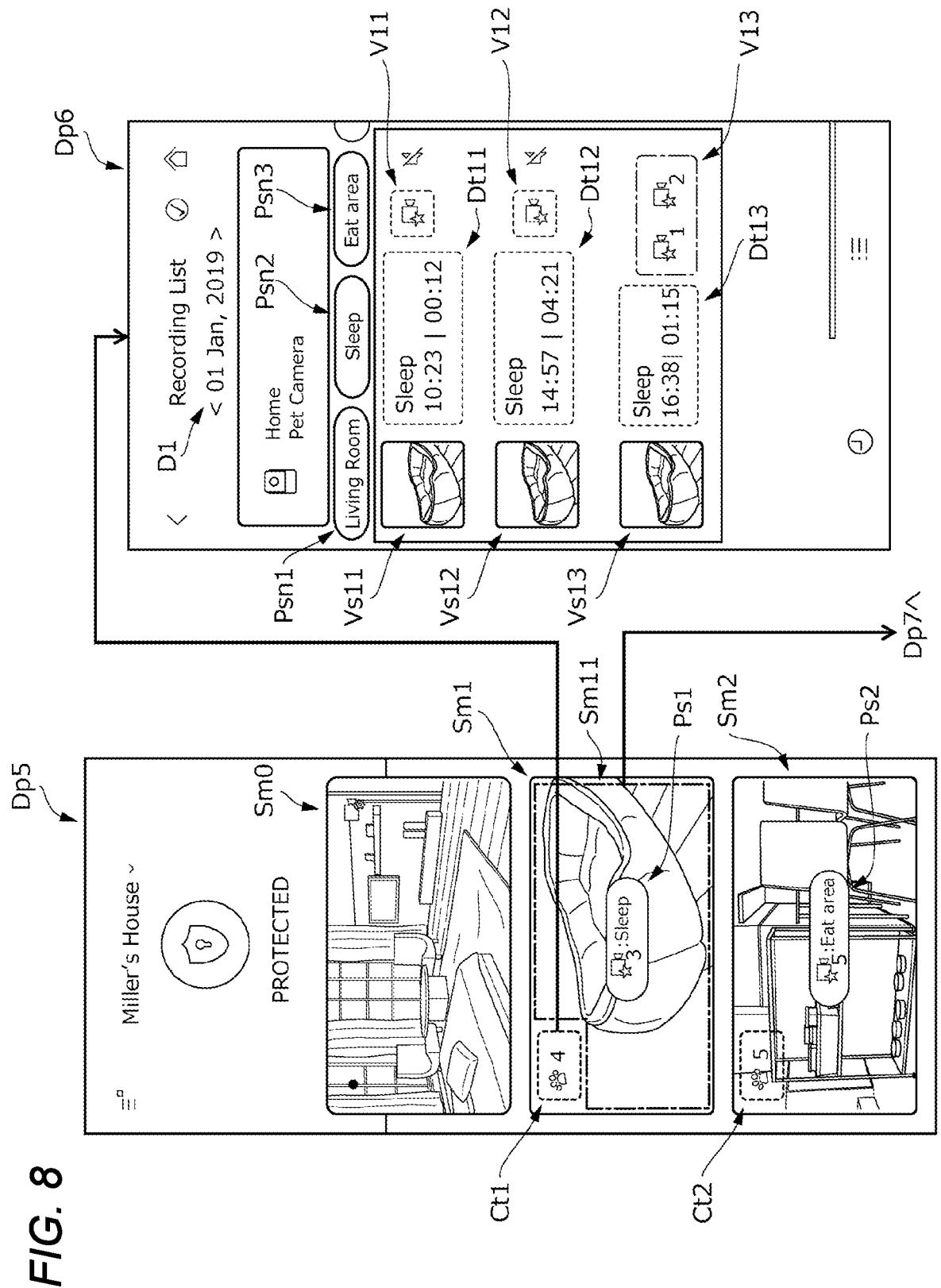
FIG. 8 is a diagram illustrating action log times and an example of displaying a list.

FIG. 8 is a diagram illustrating action log times and an example of displaying a list. FIG. 8 includes screens generated based on recorded videos received from the camera C1 at intervals set by a user operation and an action log, and is displayed on the display unit 33 of the terminal apparatus P1.

A screen Dp5 is generated by the processor 11a by using the recorded videos received from the camera C1 and the action log. The screen Dp5 is generated including a thumbnail Sm0, a thumbnail image Sm1, and a thumbnail image Sm2.

When a display region of the thumbnail Sm0 is pressed (selected) by a user operation, the terminal apparatus P1 generates a request signal that requests a live video currently captured by the camera C1, transmits the generated request signal to the camera C1, and shifts to a screen (not shown) for performing stream playback of the live video received from the camera C1 and displaying the live video. Further, on the thumbnail Sm0, a name "Living Room" of a preset position where the thumbnail Sm0 (that is, a captured image captured lastly by the camera C1) is captured is superimposed and displayed.

The thumbnail image Sm1 is a thumbnail image of a captured image captured when a detection area "Sleep" is set. In the thumbnail image Sm1, action log times Ct1 of the detection area "Sleep" and the number of recorded videos Ps1 captured and recorded when the stagnation times included in an action log is counted are superimposed and displayed. In FIG. 8, the action log times of the detection area "Sleep" is "four times". Further, the number of recorded videos of the detection area "Sleep" is "three".

The thumbnail image Sm2 is a thumbnail image of a captured image captured when a detection area "Eat area" is set. In the thumbnail image Sm2, action log times Ct2 of the detection area "Eat area" and the number of recorded videos Ps2 captured and recorded when the stagnation times included in an action log is counted are superimposed and displayed. In FIG. 8, the action log times of the detection area "Eat area" is "five times". Further, the number of recorded videos of the detection area "Eat area" is "five".

When a region including a vicinity of the action log times Ct1 on the thumbnail image Sm1 is pressed (selected) by a user operation, the processor 31a generates a screen Dp6 that displays a list of detailed information of an action log of the detection area "Sleep".

When another region Sm11 on the thumbnail image Sm1 is pressed (selected) by a user operation, the processor 31a generates a request signal that requests a live video of the detection area "Sleep" and transmits the generated request signal to the camera C1. Based on the request signal, the camera C1 starts capturing and recording of an image capturing region when the detection area "Sleep" is set (image capturing region shown by the detection area setting screen Mn2 in FIG. 5), and transmits the captured live video to the terminal apparatus P1. The processor 31a of the terminal apparatus P1 generates a screen Dp7 (see FIG. 9) that displays the live video received from the camera C1 and detailed information of an action log.

The screen Dp6 is generated including an image capturing date D1, detection area buttons Psn1, Psn2, and Psn3, a plurality of thumbnail images Vs11, Vs12, and Vs13, a plurality of pieces of recorded video information Dt11, Dt12, and Dt13, and a plurality of icons V11, V12, and V13.

Although the plurality of thumbnail images, recorded video information, and icons are displayed on the screen Dp6, for example, when the stagnation times are one, these may be one.

Each of the detection area buttons Psn1 to Psn3 is a button for filtering and displaying an action log and a recorded video for each detection area set by a user operation. When any one of the detection area buttons Psn1 to Psn3 is pressed (selected) by a user operation, the processor 31a displays, on the screen Dp6, a list of recorded videos captured by including a selected preset position or detection area in an image capturing region.

Each of the plurality of thumbnail images Vs11 to Vs13 is an image obtained by converting a first captured image of a recorded video into a thumbnail, and one image is generated for each recorded video.

Each of the plurality of pieces of recorded video information Dt11 to Dt13 includes a name of a detection area where the moving object is first detected, a recording start time of a recorded video, and a recording length of the recorded video. The recorded video information Dt11 includes the name of the detection area "Sleep", the recording start time of the recorded video "10:23", and the recording length of the recorded video "00:12", and is displayed on the screen Dp6. The recorded video information Dt12 includes the name of the detection area "Sleep", the recording start time of the recorded video "14:57", and the recording length of the recorded video "04:21". Further, the recorded video information Dt13 includes the name of the detection area "Sleep", the recording start time of the recorded video "16:38", and the recording length of the recorded video "01:15".

When stagnation times are counted up in a plurality of detection areas in one recorded video, a number indicating a detection area where the stagnation times are counted is provided and generated as shown in the icon V13.

Figure 9:
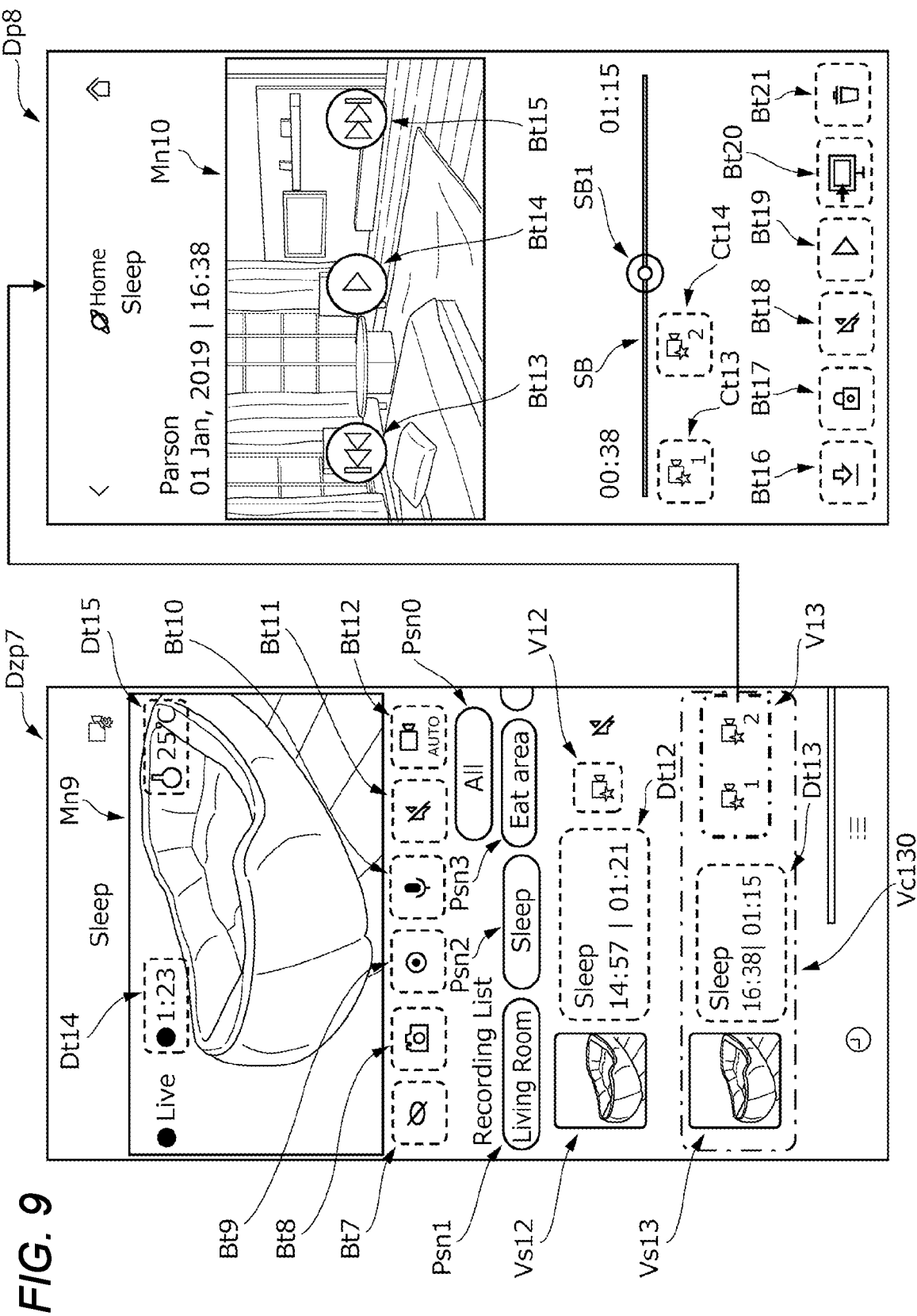
FIG. 9 is a diagram illustrating an example of playing back a recorded video of an action log.

FIG. 9 is a diagram illustrating an example of playing back a recorded video of an action log. When another region Sm11 on the thumbnail image Sm1 is pressed (selected) by a user operation, the screen Dp7 shown in FIG. 9 is generated by the processor 31a and displayed on the display unit 33.

The screen Dp7 is a screen that displays a list of detailed information of an action log filtered by the detection area "Sleep", and shows a screen where the detailed information of the action log of the screen Dp6 shown in FIG. 8 is scrolled by a user operation and the thumbnail images Vs12 and Vs13 are displayed. The screen Dp7 is generated including a live video display region Mn9, a plurality of buttons Bt7, Bt8, Bt9, Bt10, Bt11, and Bt12, a plurality of area buttons Psn0 to Psn3, the plurality of thumbnail images Vs12 and Vs13, the plurality of pieces of recorded video information Dt12 and Dt13, and the plurality of icons V12 and V13.

The live video display region Mn9 displays a live video currently captured by the camera C1 in an image capturing region when the detection area "Sleep" is set (the image capturing region shown by the detection area setting screen Mn2 of FIG. 5). On the live video display region Mn9, a recording time period Dt14 of a current recorded video and an air temperature Dt15 at a current installation position of the camera C1 measured by the temperature sensor 17 are superimposed and displayed.

The button Bt7 is a button for turning on/off an output function of a live video (a captured video) captured by the camera C1. When the button Bt7 is pressed (selected) by a user operation, the terminal apparatus P1 generates a control signal that requests transmission of a live video and transmits the generated control signal to the camera C1. When receiving the control signal for turning on the output function of the live video, the camera C1 transmits the live video (captured video) to the terminal apparatus P1. On the other hand, when the button Bt7 is pressed (selected) again by a user operation, the terminal apparatus P1 generates a control signal for turning off the output function of the live video and transmits the generated control signal to the camera C1. When receiving the control signal for turning off the output function of the live video, the camera C1 ends transmission of the live video (captured video) to the terminal apparatus P1.

The button Bt8 is a button for performing control such that one captured image (a still image) displayed at a timing of pressing (selecting) the button Bt8 by a user operation can be obtained. When the button Bt8 is pressed (selected) by a user operation, the processor 31a stores the captured image displayed at the timing of pressing (selecting) the button Bt8.

The button Bt9 is a button for controlling a recording start/recording end of a live video captured by the image capturing unit 13. When the button Bt9 is pressed (selected) by a user operation, the processor 31a generates a request signal that requests recording of a live video and transmits the generated request signal to the camera C1. The camera C1 records the live video based on the received request signal. In a case where the button Bt9 is pressed (selected) again by a user operation when the live video is recorded, the processor 31a generates a request signal that ends the recording and transmits the generated request signal to the camera C1.

The button Bt10 is a button for switching an ON/OFF state of a function of the microphone Mk2 of the terminal apparatus P1 When the button Bt10 is pressed (selected) by a user operation, the processor 31a sets the function of the microphone Mk2 of the terminal apparatus P1 to the ON state, converts a voice of the user collected by the microphone Mk2 into an electric signal, and transmits the converted electric signal to the camera C1. The camera C1 converts the received electric signal into a sound (a voice) and outputs the converted sound (the voice) from the speaker SP1. Further, when the button Bt10 is pressed (selected) again by a user operation, the processor 31a sets the function of the microphone Mk2 of the terminal apparatus P1 to the OFF state.

The button Bt11 is a button for switching an ON/OFF state of a function of outputting the electric signal received from the camera C1 from the speaker SP2 provided in the terminal apparatus P1. When the button Bt11 is pressed (selected) by a user operation, the processor 31a sets a function of outputting a sound (a voice) collected together with a captured live video from the speaker SP2 of the terminal apparatus P1 to the ON state. Further, when the button Bt11 is pressed (selected) again by a user operation, the processor 31a sets the function of the speaker SP2 of the terminal apparatus P1 to the OFF state.

The button Bt12 is a button for switching an ON/OFF state of a function (that is, a tracking function) of tracking the moving object by changing a direction of the image capturing unit 13 of the camera C1 in accordance with the position of the moving object detected by the plurality of infrared sensors 14 or the processor 11a. When the button Bt12 is pressed (selected) by a user operation, the processor 31a generates a signal for setting a tracking and image capturing function of the camera C1 (that is, a function of driving the driving unit 16) to the ON state and transmits the generated signal to the camera C1. Further, when the button Bt12 is pressed (selected) again by a user operation, the processor 31a generates a signal for setting the tracking and image capturing function of the camera C1 (that is, the function of driving the driving unit 16) to the OFF state and transmits the generated signal to the camera C1. Based on the received request signal, the camera C1 switches the tracking and image capturing function used for the moving object to the ON state or the OFF state while driving the driving unit 16 in accordance with the position of the moving object detected by the plurality of infrared sensors 14 or the processor 11a.

When the area button Psn0 is pressed (selected) by a user operation, a screen shifts to a list display screen (not shown) of recorded videos captured in all detection areas.

A screen Dp8 is a playback screen of a recorded video displayed when a region Vs130 is pressed (selected) by a user operation on the screen Dp7. The screen Dp8 is generated including a recorded video display region Mn10, a seek bar SB, a plurality of icons Ct13 and Ct14, and a plurality of buttons Bt16, Bt17, Bt18, Bt19, Bt20, and Bt21. Since the button Bt18 has the same function as that of the button Bt11 of the screen Dp7, description thereof will be omitted.

A recorded video shown in the region Vs130 is displayed in the recorded video display region Mn10. Further, on the recorded video display region Mn10, a button Bt13 for executing control to quickly return a playback part in the past, a button Bt14 for controlling playback/stop of a recorded video, and a button Bt15 for executing control to quickly advance the playback part in the future are superimposed and displayed. Each of these buttons Bt13 to Bt15 is used when controlling playback of a recorded video by a user operation, is displayed when any one of the buttons on the recorded video display region Mn10 is pressed (selected) by a user operation, and is not displayed when a certain period of time has elapsed or the button is pressed (selected) again by a user operation.

The seek bar SB visualizes a playback part of a recorded video played back in the recorded video display region Mn10 with a slider SB1. The processor 31a plays back the playback part in accordance with a position of the slider SB1 changed by a user operation. In FIG. 9, the seek bar SB shows, at a left end of the bar, a playback elapsed time "00:38" indicating a current playback part and shows, at a right end of the bar, a recording time period of a recorded video "01:15".

Each of the plurality of icons Ct13 and Ct14 is an icon indicating a timing at which stay times are counted up in each of detection areas indicated by numbers "1" and "2" (for example, the number "1" indicates the detection area "Living Room" and the number "2" indicates the detection area "Sleep"). The slider SB1 is moved to a position corresponding to an icon by using these icons as a guide, so that the user can view a recorded video when the stay times are counted up.

The button Bt16 is a button for recording a recorded video displayed in the recorded video display region Mn10 in the memory 32a of the terminal apparatus P1. When the button Bt16 is pressed (selected) by a user operation, the processor 31a records the recorded video displayed in the recorded video display region Mn10 in the memory 32a of the terminal apparatus P1.

The button Bt17 is a button for protecting the recorded video displayed in the recorded video display region Mn10 from being erroneously erased due to an erroneous operation or the like. When the button Bt17 is pressed (selected) by a user operation, the processor 31a executes a setting in which an operation such as erasing is not received in the recorded video displayed in the recorded video display region Mn10.

The button Bt19 is a button for controlling playback/stop of the recorded video displayed in the recorded video display region Mn10. When the button Bt19 is pressed (selected) by a user operation, the processor 31a controls the playback/stop of the recorded video displayed in the recorded video display region Mn10.

The button Bt20 is a button for recording the recorded video displayed in the recorded video display region Mn10 in the external memory 32b (for example, a Blu-ray (registered trademark) recorder connected via a network). When the button Bt19 is pressed (selected) by a user operation, the processor 31a records the recorded video displayed in the recorded video display region Mn10 in the external memory 32b.

The button Bt21 is a button for erasing the recorded video displayed in the recorded video display region Mn10. When the button Bt19 is pressed (selected) by a user operation, the processor 31a erases the recorded video displayed in the recorded video display region Mn10.

Figure 10:
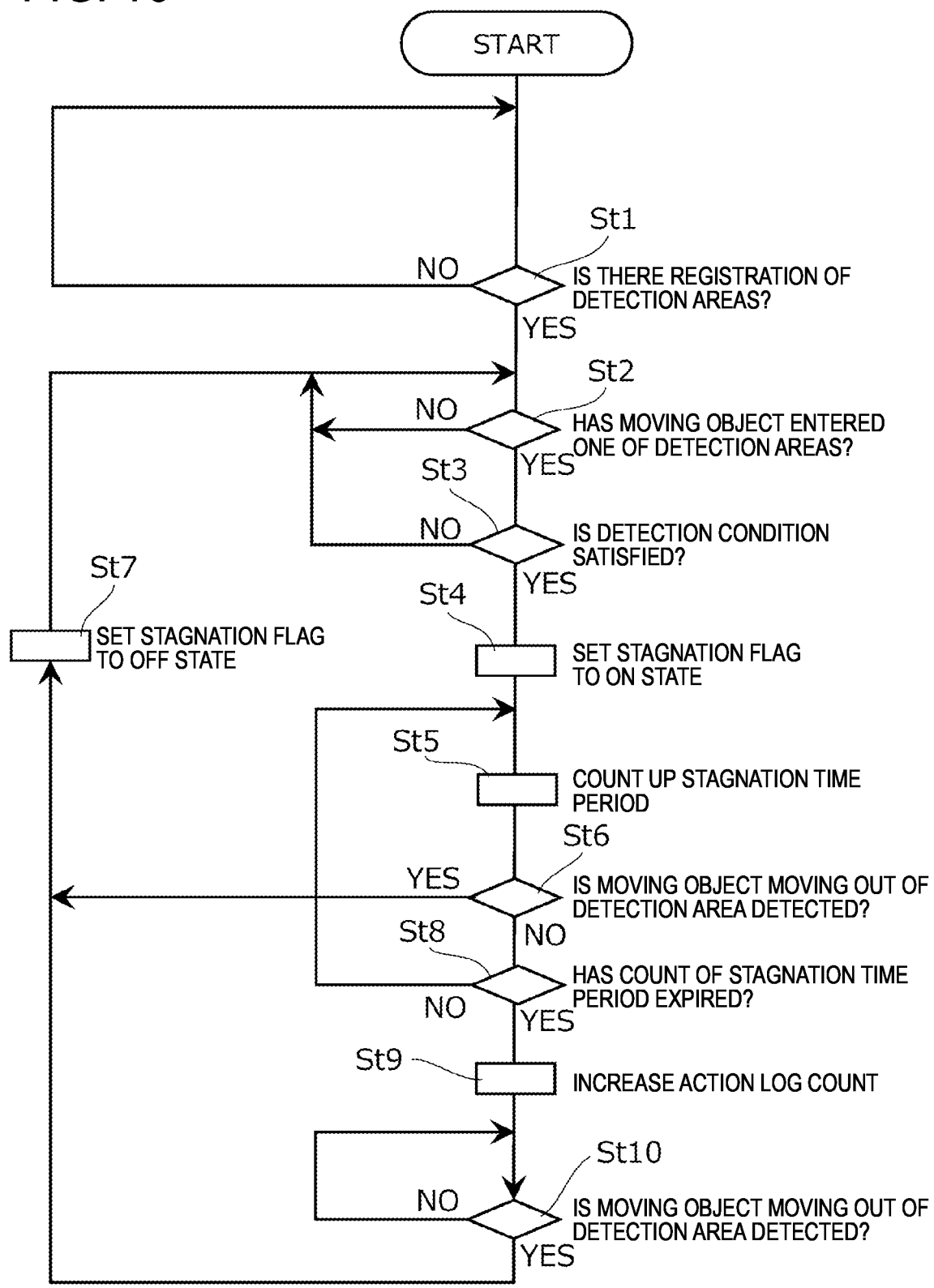
FIG. 10 is a flowchart showing an example of an operation procedure of the camera according to the first embodiment.

An operation procedure of the camera C1 will be described with reference to FIG. 10. FIG. 10 is a flowchart showing an example of the operation procedure of the camera C1 according to the first embodiment.

The camera C1 captures an image of a heat source position detected by the plurality of infrared sensors 14. The camera C1 determines whether one or more detection areas are registered (set) by a user operation in an image capturing region that is being captured (St1). When one or more detection areas are set by a user operation (St1, YES), the camera C1 periodically detects a position of the moving object based on change amounts of brightness of a plurality of captured images. The camera C1 determines whether the detected moving object has entered one of the set detection areas (St2).

When one or more detection areas are not registered by the user operation in the image capturing region that is being captured (St1, NO), the camera C1 returns to the processing of step St1.

When determining that the moving object has entered the detection area in the processing of step St2 (St2, YES), the camera C1 further determines whether the position of the moving object serving as an obtained detection result is within the detection area (St3).

When it is determined that the obtained detection result satisfies a predetermined detection condition (for example, when it is determined that the moving object has entered the detection area three consecutive times) (St3, YES), the camera C1 sets the stagnation Flag of the moving object in the detection area to an ON state (St4). In the processing of step St3, the camera C1 counts the determination executed in the processing of St2 for a first time. It is needless to say that the detection condition in the processing of step St3 is not limited to the example described above.

On the other hand, when it is determined that continuously obtained detection results do not satisfy the predetermined detection condition (for example, when it is determined that the moving object does not enter the detection area three consecutive times) (St3, NO), the camera C1 returns to the processing of step St2.

When the stagnation Flag is in the ON state, the camera C1 starts counting up a stay time period of the moving object in the detection area (St5), and determines whether the moving object has moved out of the detection area (St6). When the moving object has moved out of the detection area (St6, YES), the camera C1 ends the count-up of the stagnation time period, sets the stagnation Flag to an OFF state (St7), and returns to the processing of step St2.

On the other hand, when the moving object does not move out of the detection area (St6, NO), the camera C1 determines whether the further counted up stagnation time period has been counted up to a predetermined time period (that is, whether the count has expired) (St8). When the count of the stagnation time period has expired (St8, YES), the camera C1 increments and counts an action log (an example of the stagnation times) of the detection area (St9).

When the count of the stagnation time period has not expired (St8, NO), the camera C1 returns to the processing of step St5 and continues to count up the stagnation time period.

After the processing of step St9, the camera C1 determines whether the moving object has moved out of the detection area (St10). When the moving object has moved out of the detection area (St10, YES), the camera C1 sets the stagnation Flag to an OFF state (St7) and returns to the processing of step St2.

On the other hand, when the moving object does not move out of the detection area (St10, NO), the camera C1 re-determines whether the moving object has moved out of the detection area (St10).

As described above, a camera C1 of an indoor camera system 100 according to a first embodiment is an indoor camera that can capture an image of a moving object (for example, a pet, a child, and an elderly person), the camera C1 including: an image capturing unit 13 configured to capture an image of the moving object; a memory 12a configured to store at least one detection area in association with stagnation times, the detection area that is preset by a user and is a target area for detecting stagnation of the moving object, and the stagnation times indicating the number of times when the moving object enters the detection area and stagnates in the detection area; and a processor 11a configured to detect a position of the moving object and count the stagnation times of the moving object in the detection area based on a plurality of captured images captured by the image capturing unit 13, in which if determining, based on the plurality of captured images captured by the image capturing unit 13, that the moving object stagnates in the detection area for a predetermined time period or longer, the processor 11a increments and counts the stagnation times of the moving object in the detection area and generates an action log including identification information of the detection area and information on the stagnation times.

Accordingly, the camera C1 of the indoor camera system 100 according to the first embodiment can generate the action log of the moving object (for example, the pet, the child, and the elderly person) in one of the detection areas preset by a user operation, and can detect and record an action of the moving object in the plurality of detection areas set by a user operation.

The processor 11a of the camera C1 of the indoor camera system 100 according to the first embodiment repeatedly executes detection at a predetermined interval (for example, 200 ms). If repeatedly executing the detection and determining that a detection result thereof satisfies a predetermined detection condition (for example, conditions such as detection of the moving object being detected three consecutive times, or the moving object being detected three times out of five consecutive detection processings), the processor 11a starts measuring the stagnation time period of the moving object in the detection area. Accordingly, the camera C1 of the indoor camera system 100 according to the first embodiment can prevent erroneous detection and generation of an erroneous action log if, for example, a curtain or the like moves in the detection area or the moving object passes through the detection area.

Further, if a position of the moving object based on detection moves out of the detection area within a predetermined time period after starting measurement of the stagnation time period of the moving object in the detection area, the processor 11a of the camera C1 according to the first embodiment maintains the stagnation times of the moving object in the detection area at a current value. Accordingly, the camera C1 according to the first embodiment can prevent the erroneous detection and the generation of the erroneous action log if, for example, the curtain or the like moves in the detection area or the moving object passes through the detection area.

If change amounts of brightness of the plurality of captured images are larger than a predetermined change amount, the processor 11a of the indoor camera system 100 according to the first embodiment determines that the pet has been detected, and causes the memory 12a to start recording a captured video of the moving object captured by the image capturing unit 13. The processor 11a may include and record a captured image (a video) up to a predetermined time period before the pet reflected in a captured image is detected (for example, 5 seconds ago, or 10 seconds ago). Accordingly, the camera C1 of the indoor camera system 100 according to the first embodiment can more reliably record the action of the moving object in the detection area as a video. Therefore, the user can confirm the action of the moving object from the recorded video together with the generated action log.

The camera C1 of the indoor camera system 100 according to the first embodiment further includes: an infrared sensor 14 configured to detect a heat source position using a body temperature of the moving object as a heat source; and a driving unit 16 configured to drive at least one of a pan motor 16a and a tilt motor 16b configured to support the image capturing unit 13 such that at least one of pan rotation and tilt rotation can be executed. The processor 11a is configured to generate a control signal including the position of the moving object based on a heat source position detected by the sensor, and output the generated control signal to the driving unit 16. The driving unit 16 is configured to drive at least one of the pan motor 16a and the tilt motor 16b based on the input control signal. Accordingly, the camera C1 of the indoor camera system 100 according to the first embodiment can track the moving object detected by the processor 11a. Further, the camera C1 can capture an image of the moving object detected by the processor 11a while tracking the moving object.

The memory 12a, a video memory 12b, and an external memory 12c of the camera C1 of the indoor camera system 100 according to the first embodiment are configured to record a recorded captured video (that is, a recorded video) in association with meta information TB1 including a recording start time at which recording of a captured video is started and information on the detection area where the pet stagnates. Accordingly, if a predetermined search request or filtering request is made by a user operation, the camera C1 of the indoor camera system 100 according to the first embodiment can easily execute a search or a filtering processing by using the meta information TB1.

(Introduction to Second Embodiment)

In a configuration of JP-A-2013-219753, when moving image data is associated with an existing moving image file or a user selects to add the moving image data, the moving image data can be added to the existing moving image file to generate a moving image file (that is, a digest video). However, in the configuration of JP-A-2013-219753, when generated moving image data is not associated with existing moving image data, since the user needs to select moving image data to be added to the existing moving image data by a user operation, it is troublesome to generate the digest video. Further, in the configuration of JP-A-2013-219753, when there is many moving image data associated with the existing moving image data, a capacity of the generated moving image data becomes large, and there is a possibility that a storage capacity of a recording medium provided in an image processing apparatus is occupied by the generated moving image data.

Therefore, the second embodiment shown below describes examples of a digest video playback system and a digest video playback program that easily generate a digest video used for confirming a recorded video by detecting an action of a pet in a plurality of detection areas set by a user operation.

Second Embodiment

Since the configuration of the indoor camera system according to the second embodiment is the same as that of the indoor camera system 100 according to the first embodiment, the same components as those in the first embodiment are denoted by the same reference numerals, and description thereof is omitted. In the second embodiment, an example of generating a digest video on a designated date or during a designated period input by a user operation, by using the recorded video in the first embodiment will be described.

FIG. 11 is a diagram illustrating an example of playing back a digest video. A digest video file list is generated by the processor 11a of the camera C1, and is generated including (i) information on a designated period that includes a designated date input by a user or a simply input designated period and (ii) information on one recorded video optionally extracted from a plurality of recorded videos recorded for each image capturing date included in the designated period. When receiving the digest video file list from the camera C1, the terminal apparatus P1 generates a screen Dp9 including a digest video button WD and displays the generated screen Dp9 on the display unit 33.

The screen Dp9 is a screen in which the detection area button Psn1 is selected and only recorded videos captured in a detection area "Living Room" are filtered (extracted) and displayed in a list, and includes the digest video button WD that shifts a screen to a screen Dp10 that plays back a digest video when pressed (selected) by a user operation. When the digest video button WD is pressed (selected) by a user operation, the processor 31a generates a request signal that requests data of a recorded video recorded on any one of image capturing dates included in a digest video file list, and transmits the generated request signal to the camera C1. Further, the processor 31a shifts a screen to the screen Dp10.

The screen Dp10 is a screen that is displayed on the display unit 33 when the digest video button WD is pressed (selected) by a user operation on the screen Dp9 and that performs digest playback of a recorded video included in the digest video file list. The screen Dp10 is generated including a digest playback region Mn11, the seek bar SB, and the plurality of buttons Bt18 and Bt19. On the screen Dp10, a slider SB2 of the seek bar SB indicates a position indicating a playback elapsed time "00:03" that indicates a current playback part in a recording time period "00:18".

The button Bt19 of the screen Dp10 is a button for switching from digest playback in which a currently played back recorded video is played back at each predetermined time interval (for example, five seconds) to normal playback in which a full length of a recording length is played back. When the button Bt19 is pressed (selected) by a user operation, the terminal apparatus P1 requests the camera C1 to transmit a full length of a recording length of the currently played back recorded video, and plays back the recorded video transmitted from the camera C1.

In the digest playback region Mn11, recorded videos that are included in the digest video file list and received from the camera C1 are sequentially subjected to stream playback and displayed at each predetermined time interval (for example, five seconds).

Figure 12A:
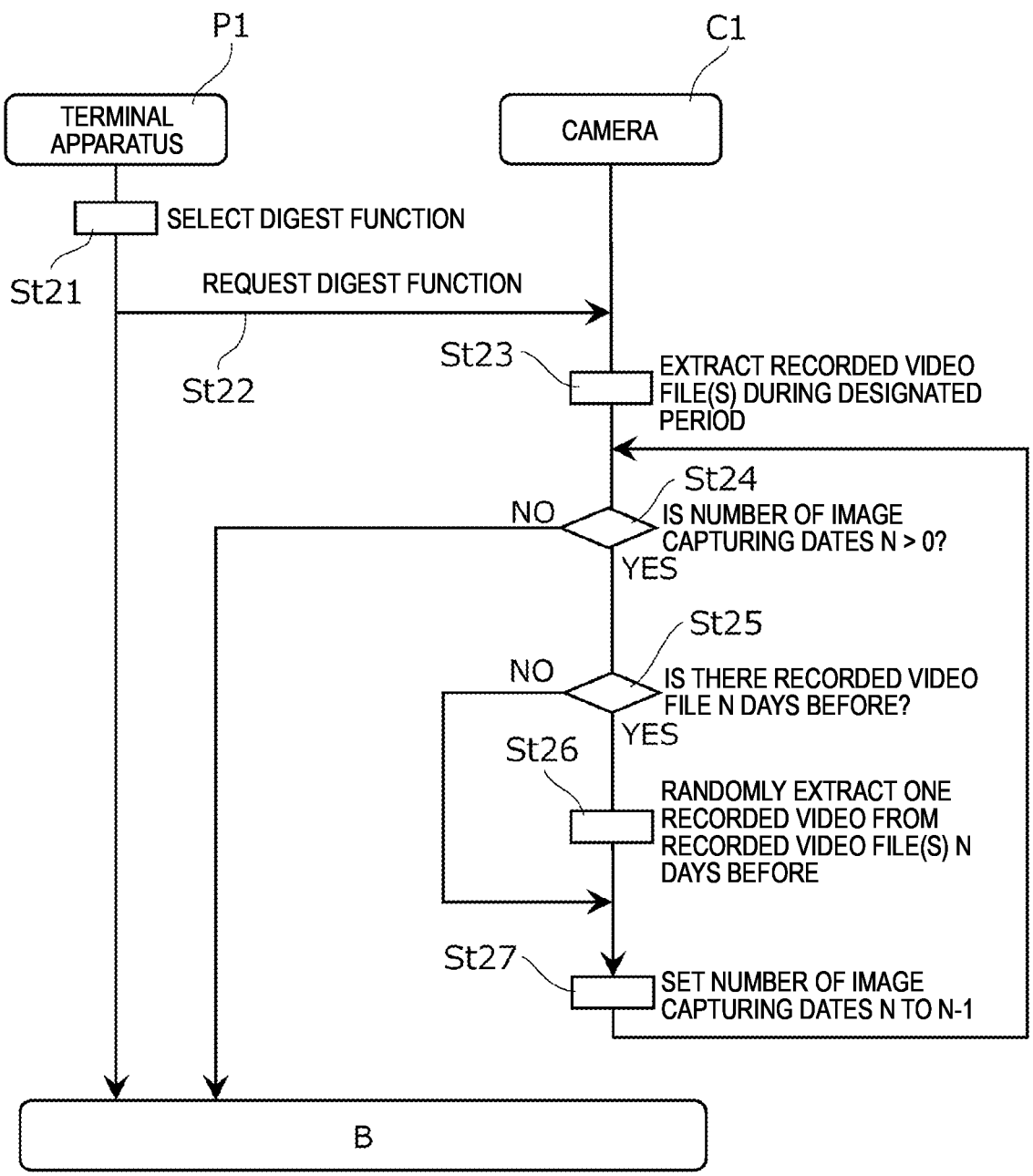
FIG. 12A is a sequence diagram illustrating an example of a generation procedure of a digest video of an indoor camera system according to a second embodiment.
Figure 12B:
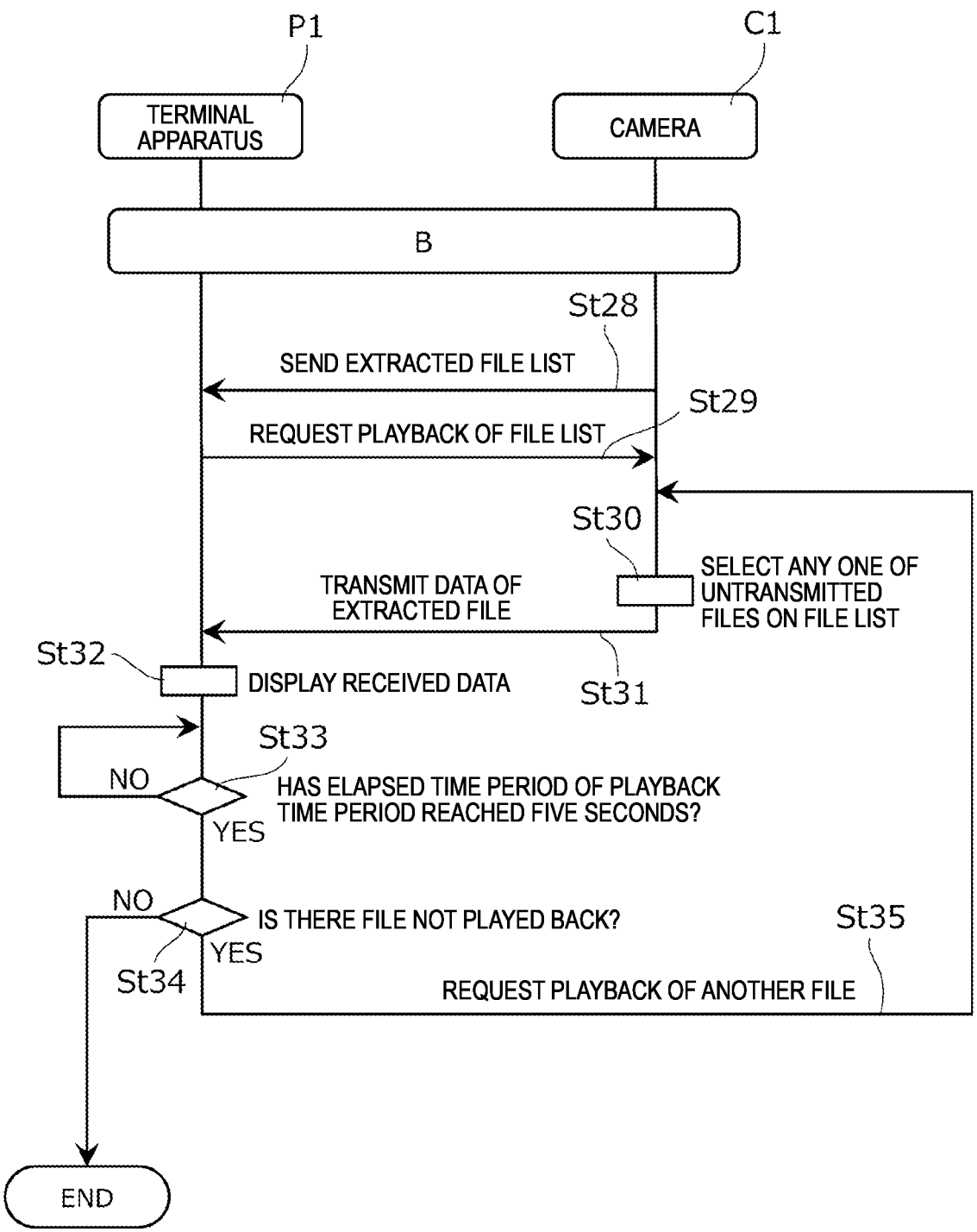
FIG. 12B is a sequence diagram illustrating an example of a display procedure of the digest video of the indoor camera system according to the second embodiment.

An example of a generation procedure and an example of a display procedure of a digest video of the indoor camera system according to the second embodiment will be described with reference to FIGS. 12A and 12B. FIG. 12A is a sequence diagram illustrating the example of the generation procedure of the digest video of the indoor camera system according to the second embodiment. FIG. 12B is a sequence diagram illustrating the example of the display procedure of the digest video of the indoor camera system according to the second embodiment. In the generation procedure and the display procedure of the digest video shown in FIGS. 12A and 12B, although a designated period will be described as an example showing a past week including a designated date selected by the user, it is needless to say that the designated period is not limited thereto. The designated period may be, for example, a period of 5 days, 10 days, or the like.

When execution of a digest function is selected by a user operation (St21), the terminal apparatus P1 receives a user operation for a designated period of a digest video to be generated. The terminal apparatus P1 generates a request signal that includes date information of a past week including a designated date input by the user as information on a designated period and that requests the execution of the digest function, and transmits the generated request signal to the camera C1 (St22).

The camera C1 extracts a recorded video file for each image capturing date included in the designated period, based on the information on the designated period included in the received request signal (St23). The recorded video file referred to here is a file in which a plurality of recorded videos captured for each image capturing date are recorded.

The camera C1 determines whether the number of image capturing dates N (N: integer) included in the designated period is N>0 (St24). When determining that the number of image capturing dates N included in the designated period is N>0 (St24, YES), the camera C1 further determines whether a recorded video is recorded in a recorded video file N days ago (St25).

When one or more recorded videos are recorded in recorded video files N days before a designated date (St25, YES), the camera C1 randomly extracts any one of one or more recorded videos recorded in the recorded video files N days before the designated date (St26). The camera C1 executes a processing of performing N−1 (that is, decrement) for the number of image capturing dates N (St27), and returns to the processing of step St24.

On the other hand, when one or more recorded videos are not recorded in the recorded video files N days before the designated date (St25, NO), the camera C1 executes a processing of performing N−1 (that is, decrement) for the number of image capturing dates N (St27), and returns to the processing of step St24.

The camera C1 repeatedly executes the processings of step St24 to step St27 until the number of image capturing dates N included in the designated period becomes N=0. The camera C1 determines whether the number of image capturing dates N included in the designated period is N>0 (St24). When the number of image capturing dates N included in the designated period is N=0 (St24, NO), the camera C1 generates a digest video file including information on the recorded video extracted in the processing of step St26 (for example, the meta information TB1) and information on an image capturing date on which the recorded video is recorded, for each image capturing date included in the designated period. The camera C1 may generate a file only including the information on the image capturing date for an image capturing date on which a recorded video is not recorded.

The camera C1 further generates a file list including each generated digest video file for each image capturing date included in the designated period, and transmits the file list to the terminal apparatus P1 (St28).

When a recorded video is not recorded on any one of image capturing dates in the designated period input by the user in the processing of step St24, the camera C1 may transmit a message notifying that there is no recorded video in the designated period to the terminal apparatus P1 and causes the message to be displayed.

The terminal apparatus P1 generates a request signal that requests digest playback of a recorded video for each image capturing date included in the file list transmitted from the camera C1, and transmits the generated request signal to the camera C1 (St29).

The camera C1 selects any one file that is from files included in the file list and is not transmitted to the terminal apparatus P1 (that is, is not subjected to digest playback), based on the request signal transmitted from the terminal apparatus P1 (St30). The camera C1 transmits data of a recorded video included in the selected file to the terminal apparatus P1 (St31).

The terminal apparatus P1 performs stream playback of the data of the recorded video transmitted from the camera C1 (St32) and starts counting up a playback time period of the recorded video. The terminal apparatus P1 determines whether an elapsed time period of the playback time period of the recorded video has reached five seconds (St33). When the elapsed time period of the playback time period has reached five seconds (St33, YES), the terminal apparatus P1 collates the data of the recorded video received from the camera C1 with information on recorded videos included in the file list and determines whether there is a file not played back (St34). Although an example in which the elapsed time period of the playback time period determined in step St33 has reached five seconds is shown, it is needless to say that the playback time period of the recorded video subjected to the digest playback is not limited to five seconds.

On the other hand, when the elapsed time period of the playback time period has not reached five seconds (St33, NO), the terminal apparatus P1 returns to the processing of step St33 again and re-determines whether the elapsed time period of the playback time period of the recorded video has reached five seconds. When the playback time period determined in step St33 is longer than a minimum recording time period of the recorded video recorded by the camera C1, the terminal apparatus P1 may shift to the processing of step St34.

When determining that there is a file not played back in the file list including the information on the recorded videos (St34, YES), the terminal apparatus P1 generates a request signal that requests digest playback of a recorded video included in another file not played back, and transmits the generated request signal to the camera C1 (St35). The camera C1 shifts to the processing of step St30 based on the request signal transmitted from the terminal apparatus P1.

When determining that there is no file not played back in the file list including the information on the recorded videos (St34, NO), the terminal apparatus P1 ends the digest function.

As described above, in the digest video playback system according to the second embodiment, the camera C1 (an example of a camera) that captures an image of the moving object (for example, a pet, a child, and an elderly person) and the terminal apparatus P1 are connected to communicate with each other. The camera C1 records a recorded video obtained by capturing an image of the moving object for each image capturing date. The terminal apparatus P1 receives input of a designated period including an image capturing date on which a recorded video is recorded, and transmits the designated period to the camera C1. The camera C1 refers to a plurality of recorded videos for each image capturing date recorded on an image capturing date included in the received designated period so as to optionally extract any one of the recorded videos for each image capturing date. The terminal apparatus P1 transmits, to the camera C1, a transmission request for one extracted video extracted corresponding to any one of image capturing dates included in the designated period, receives the one extracted video that is extracted corresponding to any one of the image capturing dates and transmitted from the camera C1, plays back the one extracted video on the display unit 33 for a predetermined time period, and repeatedly transmits, to the camera C1, a transmission request for one extracted video extracted corresponding to another image capturing date included in the designated period after the playback for the predetermined time period (for example, after the elapsed time period of the playback time period has reached five seconds).

Accordingly, the digest video playback system according to the second embodiment can easily generate a digest video used for confirming a recorded video by detecting an action of the moving object in the plurality of detection areas set by a user operation. Further, since the digest video playback system optionally selects and extracts one recorded video for each image capturing date, a data capacity of the generated file list can be controlled. Furthermore, since the digest video playback system plays back a digest video to be subjected to the digest playback (that is, a recorded video optionally extracted for each image capturing date) for a predetermined time period based on the generated digest video file list, a time period required for a confirmation work by a user of the digest video can be shortened.

The camera C1 of the digest video playback system according to the second embodiment generates list information of one extracted video (that is, the digest video file list) extracted corresponding to an image capturing date included in the designated period, and transmits the generated list information to the terminal apparatus P1. Based on the list information (that is, the digest video file list), the terminal apparatus P1 generates the transmission request for one extracted recorded video extracted corresponding to another image capturing date included in the designated period. Accordingly, the digest video playback system according to the second embodiment can play back all recorded videos extracted on all image capturing dates that are included in the designated period and at which the recorded videos are recorded.

When there is no recorded video recorded on an image capturing date included in the designated period, the camera C1 of the digest video playback system according to the second embodiment optionally extracts any one of recorded videos for each image capturing date other than the image capturing date at which the recorded video is not recorded during the designated period. Accordingly, the digest video playback system according to the second embodiment can easily generate a digest video except on the image capturing date at which the recorded video is not recorded.

The camera C1 of the digest video playback system according to the second embodiment generates the meta information TB1 including the recording start time of the recorded video and the information on the detection area that is an example of an image capturing area where a recorded video is captured, and records a recorded video to which the generated meta information TB1 is given. Accordingly, when transmitting and receiving, between the camera C1 and the terminal apparatus P1, data of a recorded video included in an optional file from a plurality of files included in the file list, the digest video playback system according to the second embodiment can easily search data of a recorded video to be transmitted to the terminal apparatus P1 based on the meta information TB1 included in the recorded video. Further, the digest video playback system can easily display information on a detection area where a recorded video serving as a played back digest video is recorded (captured).

The terminal apparatus P1 of the digest video playback system according to the second embodiment receives designation of a detection area that is an example of an image capturing area in the meta information TB1 given to a recorded video, and transmits information on the designated image capturing area to the camera C1. The camera C1 is given the meta information TB1 including the information on the designated image capturing area and refers to the plurality of recorded videos for each image capturing date recorded on an image capturing date included in the designated period so as to optionally extract any one of the recorded videos for each image capturing date. Accordingly, even when the user desires to execute the digest function by only using a recorded video recorded in a predetermined detection area, the digest video playback system according to the second embodiment can easily filter a recorded video extracted as a digest video based on information on a detection area included in the meta information TB1.

Although various embodiments have been described above with reference to the accompanying drawings, the present disclosure is not limited to these embodiments. It will be apparent to those skilled in the art that various changes, modifications, substitutions, additions, deletions, and equivalents can be conceived within the scope of the claims, and it should be understood that such changes and the like also belong to the technical scope of the present disclosure. Components in the various embodiments mentioned above may be combined optionally in the range without deviating from the spirit of the invention.

The present disclosure is useful as presentation of a digest video playback system and a digest video playback program that easily generate a digest video used for confirming a recorded captured video by detecting an action of a pet in a plurality of detection areas set by a user operation.

The invention claimed is:

1. An indoor camera configured to capture an image of a pet, the indoor camera comprising:
an image capturing unit configured to capture an image of the pet;
a storage unit configured to store at least one detection area in association with stagnation times, the detection area that is preset by a user and is a target area for detecting stagnation of the pet, and the stagnation times indicating the number of times when the pet enters the detection area and stagnates in the detection area; and
a processor configured to detect a position of the pet and count the stagnation times of the pet in the detection area based on a plurality of captured images captured by the image capturing unit,
wherein if determining, based on the plurality of captured images captured by the image capturing unit, that the pet stagnates in the detection area for a predetermined time period or longer, the processor increments and counts the stagnation times of the pet in the detection area and generates an action log including identification information of the detection area and information on the stagnation times.

2. The indoor camera according to claim 1, further comprising:
a sensor configured to detect a heat source position using a body temperature of the pet as a heat source; and
a driving unit configured to drive at least one of a pan motor and a tilt motor configured to support the image capturing unit such that at least one of pan rotation and tilt rotation is executed,
wherein the processor is configured to generate a control signal including a position of the pet based on the heat source position detected by the sensor, and output the generated control signal to the driving unit, and
wherein the driving unit is configured to drive at least one of the pan motor and the tilt motor based on the input control signal.

3. A pet action log recording system comprising the indoor camera according to claim 1 and a terminal apparatus, the indoor camera and the terminal apparatus being connected to communicate with each other,
wherein the indoor camera is configured to transmit the stagnation times of the pet in the detection area to the terminal apparatus; and
wherein the terminal apparatus is configured to display the received stagnation times of the pet on a monitor.

4. The indoor camera according to claim 1,
wherein if determining that a predetermined detection condition is satisfied as a result of repeated execution of detection at a predetermined interval, the processor starts measuring a stagnation time period of the pet in the detection area.

5. The indoor camera according to claim 4,
wherein the processor maintains the stagnation times of the pet in the detection area at a current value if a position of the pet based on the detection moves out of the detection area within the predetermined time period after starting the measurement of the stagnation time period of the pet in the detection area.

6. The indoor camera according to claim 1,
wherein the processor causes the storage unit to start recording a captured video of the pet captured by the image capturing unit if change amounts of brightness of the plurality of captured images are larger than a predetermined change amount.

7. The indoor camera according to claim 6,
wherein the storage unit is configured to record the recorded captured video in association with meta information including a recording start time at which recording of the captured video is started and information on the detection area where the pet stagnates.

\* \* \* \* \*